United States Patent
Tanei et al.

(10) Patent No.: US 6,910,461 B2
(45) Date of Patent: Jun. 28, 2005

(54) CONTROL APPARATUS FOR INTERNAL COMBUSTION ENGINE

(75) Inventors: Katsutoshi Tanei, Aichi-ken (JP); Masanao Idogawa, Toyota (JP); Rihito Kaneko, Aichi-ken (JP); Kenji Kasashima, Aichi-ken (JP); Noboru Takagi, Toyota (JP); Isao Takagi, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/845,163

(22) Filed: May 14, 2004

(65) Prior Publication Data

US 2005/0005908 A1 Jan. 13, 2005

(30) Foreign Application Priority Data

May 15, 2003 (JP) ........................................ 2003-137288
Oct. 21, 2003 (JP) ........................................ 2003-361077
Dec. 12, 2003 (JP) ........................................ 2003-414982

(51) Int. Cl.[7] .......................... F02D 13/02; F01L 13/00; F02P 5/152
(52) U.S. Cl. ........................... 123/406.29; 123/406.45; 123/406.33; 123/90.15; 123/568.14
(58) Field of Search ................. 123/406.29, 406.33, 123/406.45, 406.48, 90.11, 90.15, 90.16, 90.17, 568.14

(56) References Cited

U.S. PATENT DOCUMENTS 6,105,552 A * 8/2000 Arisawa et al. ........ 123/406.37
6,769,404 B2 * 8/2004 Aoyama et al. ....... 123/406.29
6,848,422 B2 * 2/2005 Hashizume et al. ... 123/406.29

FOREIGN PATENT DOCUMENTS

| JP | 275043 | * 11/1990 | ........... F02D/13/02 |
| JP | A-08-338272 | 12/1996 | |
| JP | A-09-303165 | 11/1997 | |
| JP | A-11-190236 | 7/1999 | |
| JP | 130027 | * 5/2002 | ........... F02D/13/02 |

OTHER PUBLICATIONS

U.S. Appl. No. 10/745,555, filed Jan. 12, 2004, Tanei et al.

* cited by examiner

Primary Examiner—Hai Huynh
(74) Attorney, Agent, or Firm—Oliff & Berridge, PLC

(57) ABSTRACT

Based on results of a knock control for adjusting ignition timing in accordance with the occurrence of knocking, an electronic control unit computes deposit required ignition timing akgrg, which is ignition timing determined by taking adhesion of deposits in an internal combustion engine into consideration. Based on the deposit required ignition timing akgrg, the electronic control unit reduces a vvt allowable variable range of a target VVT advancement amount, which is a control target value of a variable valve timing mechanism. The electronic control unit corrects a required ignition timing based on the actual VVT advancement amount vt, which is chanted according to the reduction of the allowable variable range of the target VVT advancement amount. As a result, problems resulting from the adhesion of deposits are effectively avoided.

23 Claims, 11 Drawing Sheets

Second Base Knock Limit Point aknokbse

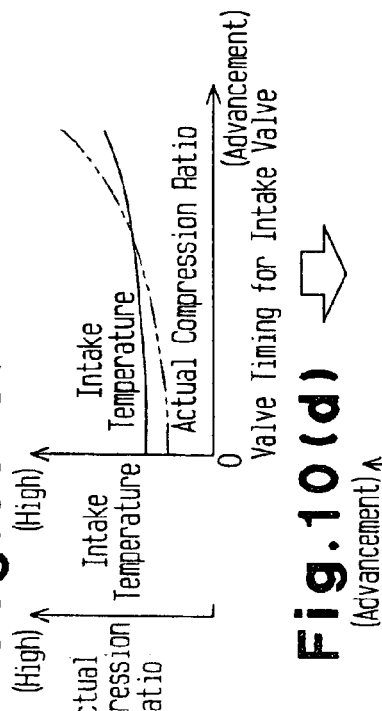
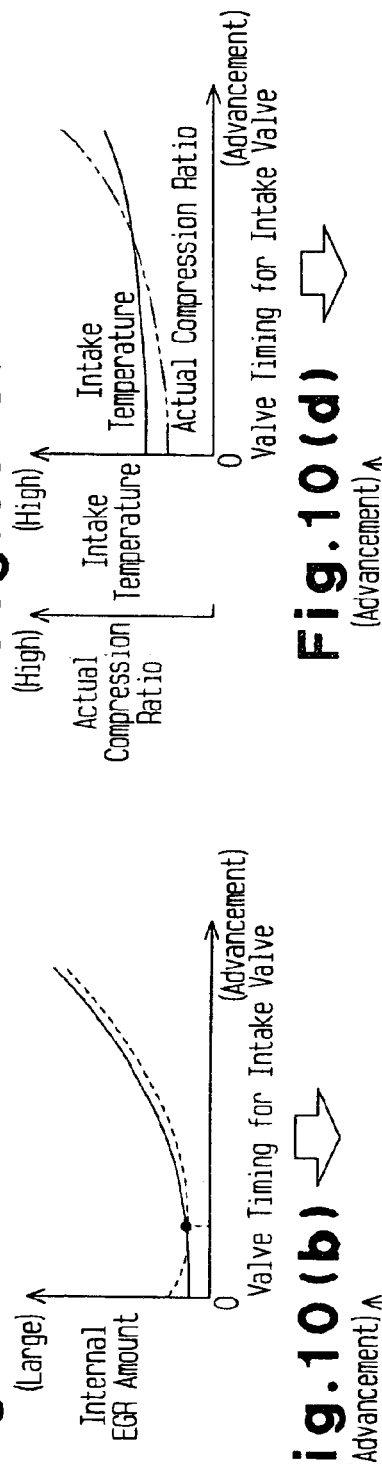
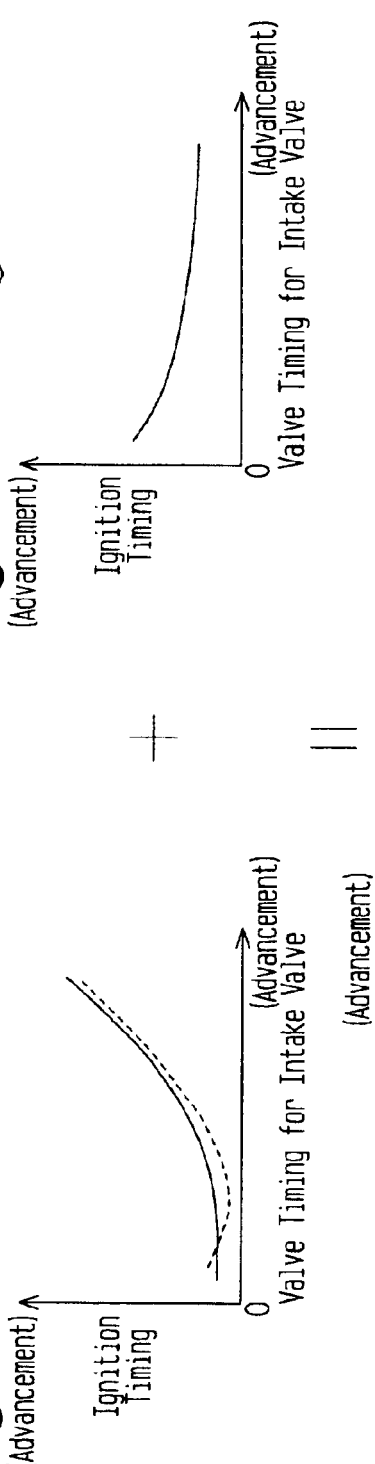
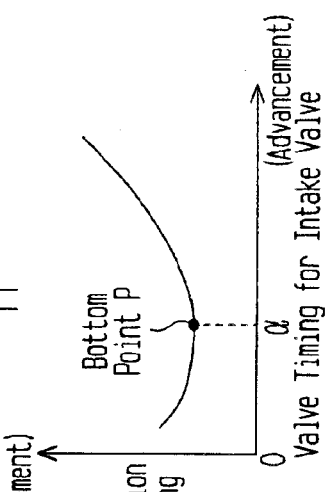

CONTROL APPARATUS FOR INTERNAL COMBUSTION ENGINE

BACKGROUND OF THE INVENTION

The present invention relates to a control apparatus for an internal combustion engine, and in particular, to a control apparatus suitably applicable to an internal combustion engine that performs both knock control for adjusting an ignition timing and a variable valve actuation control for an engine valve in accordance with the occurrence of knocking.

In an internal combustion engine, depending on its use, deposits originating from an unburned fuel, a blow-by gas, a lubricant, or the like may be gradually deposited on an intake port, an intake valve, a piston, or the like. It is known that such an increase in the amount of deposits leads to, for example, a decrease in the substantial volume of a combustion chamber and an associated increase in in-cylinder compression pressure during burning, thus increasing the possibility of knocking.

In general, for the internal combustion engine, knock control is preformed to detect the occurrence of knocking using a knock sensor and adjust the ignition timing on the basis of the results of the detection. The knock control suppresses the occurrence of knocking by retarding the ignition timing when the incidence of knocking is high, while advancing the ignition timing when the incidence is low.

On the other hand, in recent years, internal combustion engines with a variable valve actuation mechanism that can vary the valve actuation of engine valves, that is, intake or exhaust valves, have been put to practical use, for example, a variable valve timing mechanism that can vary a valve timing for the engine valves and a variable valve lift mechanism that can vary the valve lift amount of the engine valves. Such an internal combustion engine with a variable valve actuation mechanism can reduce the actual compression ratio of the engine by adjusting the valve actuation of the engine valves. Thus, the internal combustion engine with the variable valve actuation mechanism can also suppress the occurrence of knocking by allowing the variable valve actuation mechanism to reduce the actual compression ratio to prevent an increase in in-cylinder compression pressure caused by deposits.

Thus, in the prior art, a control apparatus for an internal combustion engine has been proposed which performs knock control for the ignition timing based on the results of the detection by the knock sensor and which also allows the variable valve actuation mechanism to perform the variable control of the valve actuation on the basis of the results of the detection by the knock sensor as set forth in Japanese Patent Laid-Open No. 8-338272.

With the control apparatus described in Japanese Patent Laid-Open No. 8-338272, the ignition timing is retarded on the basis of the detection of the occurrence of knocking by the knock sensor. On the other hand, the amount of retardation of the valve timing for the intake valve carried out by the variable valve timing mechanism is set in accordance with the intensity of the knocking detected by the knock sensor. Such a control apparatus can effectively inhibit the occurrence of knocking on the basis of the multiplier effect of the retardation of the ignition timing and the valve timing.

Once the ignition timing has been changed by the knock control, the appropriate values of the valve actuation of the engine valves are also changed. Thus, once the ignition timing and the valve actuation have been individually changed as in the case of the above conventional control apparatus, the set values of the valve actuation may deviate from the appropriate values in the present engine operating state. As a result, the performance of the engine otherwise successfully provided may not be adequately enjoyed to its limit. Thus, although the conventional control apparatus is effective on the inhibition of the occurrence of knocking, the valve actuation is not sufficiently optimized so as to deal with changes in engine operating state accompanying changes in ignition timing. Therefore, the conventional control apparatus still has room for improvement in terms of mileage or the like.

SUMMARY OF THE INVENTION

It is an object of the present invention to provide a control apparatus for an internal combustion engine that more effectively solves problems associated with the deposits.

To achieve the foregoing and other objectives and in accordance with the purpose of the present invention, a control apparatus for an internal combustion engine is provided. The engine generates power by combusting mixture of air and fuel. The apparatus performs a knock control for adjusting an ignition timing, at which the air-fuel mixture is ignited, and a variable valve actuation control for adjusting a valve actuation, which is actuation of a valve of the engine, in accordance with the occurrence of knocking in the engine. The apparatus determines the magnitude of a change in the ignition timing due to adhesion of deposits in the engine based on the results of the knock control. Based on the magnitude of the change in the ignition timing, the apparatus changes a set value of the valve actuation in the variable valve actuation control.

The present invention also provides a method for controlling an internal combustion engine. The engine generates power by combusting mixture of air and fuel. The method includes: performing a knock control for adjusting an ignition timing, at which the air-fuel mixture is ignited, in accordance with the occurrence of knocking in the engine; performing a variable valve actuation control for adjusting a valve actuation, which is actuation of a valve of the engine in accordance with the occurrence of knocking in the engine; determining the magnitude of a change in the ignition timing due to adhesion of deposits in the engine based on the results of the knock control; and changing a set value of the valve actuation in the variable valve actuation control based on the magnitude of the change in the ignition timing.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIGS. 10(a) to 10(e) are graphs illustrating the effect of variations in valve timing for an intake valve on the knock limit point;

DETAILED DESCRIPTION OF THE PREFERRED EMBODIMENTS (First Embodiment)

A control apparatus for an internal combustion engine according to a first embodiment of the present invention will be described below with reference to the drawings.

Figure 1:
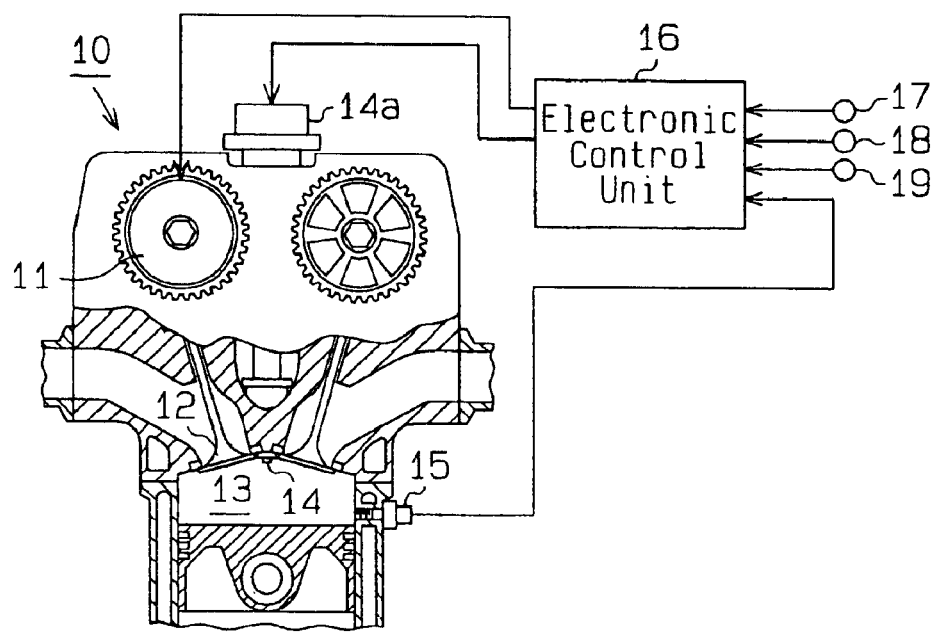
FIG. 1 is a schematic view showing the configurations of an internal combustion engine and its control system according to a first embodiment of the present invention.

As shown in FIG. 1, an internal combustion engine 10 to which the present embodiment is applied comprises a variable valve timing mechanism 11 that can vary a valve timing for an intake valve 12, as an adjustable mechanism that can vary a valve actuation (dynamic behavior) of engine valves. A combustion chamber 13 of the internal combustion engine 10 is provided with an ignition plug 14 that ignites and burns a mixture of air and fuel sucked into the combustion chamber 13, and a knock sensor 15 that detects the occurrence of knocking accompanying the burning of the mixture.

An electronic control unit 16 performs various types of control relating to the operation of the internal combustion engine 10. The electronic control unit 16 is a computer, which comprises a CPU that performs the various types of control, a memory that stores information required for the control, an output port through which an instruction signal is outputted to external equipment, and other components.

Various sensors are connected to the input port of the electronic control unit 16 to detect an engine operating state. The sensors include, for example, the knock sensor 15, a crank sensor 17 detecting a crank angle that is the rotation phase of a crank shaft, a cam sensor 18 detecting a cam angle that is the rotation angle of an intake camshaft, and a throttle sensor 19 detecting a throttle opening degree ta. Detection signals from these sensors are inputted to the electronic control unit through the input port. An engine speed ne is determined from a detection signal from the crank sensor 17.

On the other hand, the output port of the electronic control unit 16 connects to a drive circuit for actuators required to control the engine, such as the variable valve timing mechanism 11 and an igniter 14a that generates a high voltage current required to cause the ignition plug 14 to ignite a mixture. The electronic control unit 16 controls the engine by controlling the actuators on the basis of detection signals from the sensors.

Figure 2:
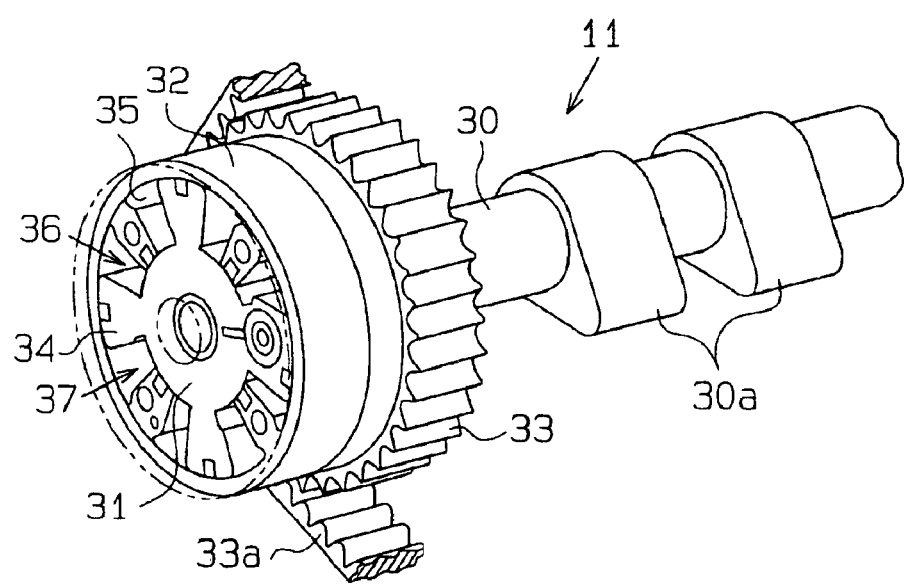
FIG. 2 is a perspective view of a variable valve timing mechanism provided in the internal combustion engine in FIG. 1.

Now, the variable timing mechanism 11 will be described with reference to FIG. 2. FIG. 2 is a perspective view showing the sectional structure of the variable valve timing mechanism 11.

As shown in the figure, the variable valve timing mechanism 11 is disposed at one end of an intake camshaft 30 on which cams 30a opening and closing an intake valve 12 are disposed. The variable valve timing mechanism 11 is roughly composed of a vane rotor 31 and a housing 32.

A cam sprocket 33 is disposed at the end of the intake camshaft 30 at which the variable valve timing mechanism 11 is disposed so that the cam sprocket 33 is rotatable relative to the intake camshaft 30. The cam sprocket 33 is coupled to the crank shaft via a timing belt 33a. The housing 32 is integrally rotatably fixed to the cam sprocket 33.

The vane rotor 31 is disposed inside the housing 32 so as to be rotatable relative to the housing 32. The vane rotor 31 is integrally rotatably fixed to the intake camshaft 30. A plurality of vanes 34 are formed on the outer periphery of the vane rotor 31. The vanes 34 are accommodated in respective concave portions 35 formed around the inner periphery of the housing 32 so as to be movable in a circumferential direction. Pressure chambers 36 and 37 are formed at the respective sides of each vane 34 and are partitioned by the outer peripheral surface of the vane rotor 31, the inner peripheral surface of the housing 32, and others.

Oil is fed into each of the pressure chambers 36 and 37 so that its pressure acts on the circumferential sides of the corresponding vane 34. Depending on a difference in oil pressure between the pressure chambers 36 and 37, power is generated to rotatably move the vane rotor 31 relative to the housing 32.

The rotation of the vane rotor 31 relative to the housing 32 changes the relative rotation phase of the intake camshaft 30 with respect to the cam sprocket 33. This in turn changes the rotation phase of the cams 30a, which open and close the intake valve 12, relative to the crank shaft. Thus, on the basis of the control of the oil pressure in the pressure chambers 36 and 37, the valve timing for the intake valve 12 is changed.

<1> Summary of Knock Control

In the internal combustion engine 10 configured as described above, the electronic control unit 16 performs knock control that adjusts an ignition timing in accordance with the occurrence of knocking detected by the knock sensor 15. Now, a brief description will be given of the knock control according to the present embodiment.

The knock control according to the present embodiment is performed by setting a required ignition timing afin that is a control instruction value for the ignition timing, as described below. Here, the ignition timing is expressed as the advancement amount [°CA] of the crank angle with respect to the top dead center of a cylinder that is a firing target.

(Calculation of Maximum Retardation Amount akmax)

To set the required ignition timing afin, a maximum advanced ignition timing absef and a maximum retarded ignition timing almf are first calculated; the maximum advanced ignition timing is a limit value on the advancement side of the setting range of the required ignition timing afin for the knock control, the maximum retarded ignition timing akmf being a limit value on the retardation side. Then, on the basis of these values, the maximum retardation amount akmax for the required ignition timing afin with respect to the maximum advanced ignition timing absef during the knock control is calculated.

The maximum advanced ignition timing absef is calculated on the basis of an MBT point ambt and a first knock limit point aknok1. Specifically, as shown in Equation (1) below, one of the MBT point ambt and the first knock limit point aknok1 which is closer to the point of the most significant retardation is set as the maximum advanced ignition timing absef.

$$absef=\min(ambt, aknok1) \quad (1)$$

The MBT point indicates the ignition timing (maximum torque ignition timing) that provides the maximum torque under the present engine operating conditions. The first knock limit point aknok1 indicates the advancement limit value (knock limit point ignition timing) of the ignition timing at which knocking can be reduced to an allowable level or lower under the assumed best conditions when a large-octane-number fuel, having a large knock limit value, is used. The MBT point ambt and the first knock limit point aknok1 are set taking into account the present engine speed ne, an engine load, the setting of the valve timing for the intake valve 12 executed by the variable valve timing mechanism 11, and the like. Specific manners of calculating these values will be described later.

On the other hand, the maximum retarded ignition timing akmf is set as the index value of the ignition timing with which knocking can be adequately reduced to the allowable level or lower even under the assumed worst conditions. Specifically, as shown in Equation (2) below, the maximum retarded ignition timing akmf is set as a value obtained by retarding a second knock limit point aknok2 for the ignition timing by an amount equal to the sum of a deposit correction term depvt and a present constant RTD.

$$akmf=aknok2-adepvt-RTD \quad (2)$$

The second knock limit point aknok2 indicates the advancement limit (knock limit point ignition timing) of the ignition timing at which knocking can be reduced to an allowable level or lower under the assumed best conditions when a low-octane-number fuel, having a low knock limit value, is used. The value of the second knock limit point aknok2 is set taking into account the present engine speed ne, the engine load, the setting of the valve timing for the intake valve 12 executed by the variable valve timing mechanism 11, and the like. Specific manners of calculating these values will be described later.

The deposit correction item adepvt is an index value indicative of the retardation amount of the ignition timing based on the present level of deposits in the current internal combustion engine 10. A specific manner of calculating the deposit correction term adepvt will also be described later.

The maximum retardation amount akmax is calculated from the maximum advanced ignition timing absef and maximum retarded ignition timing akmf calculated as described above, on the basis of Equation (3) below.

$$akmax=absef-akmf \quad (3)$$

Figure 3:
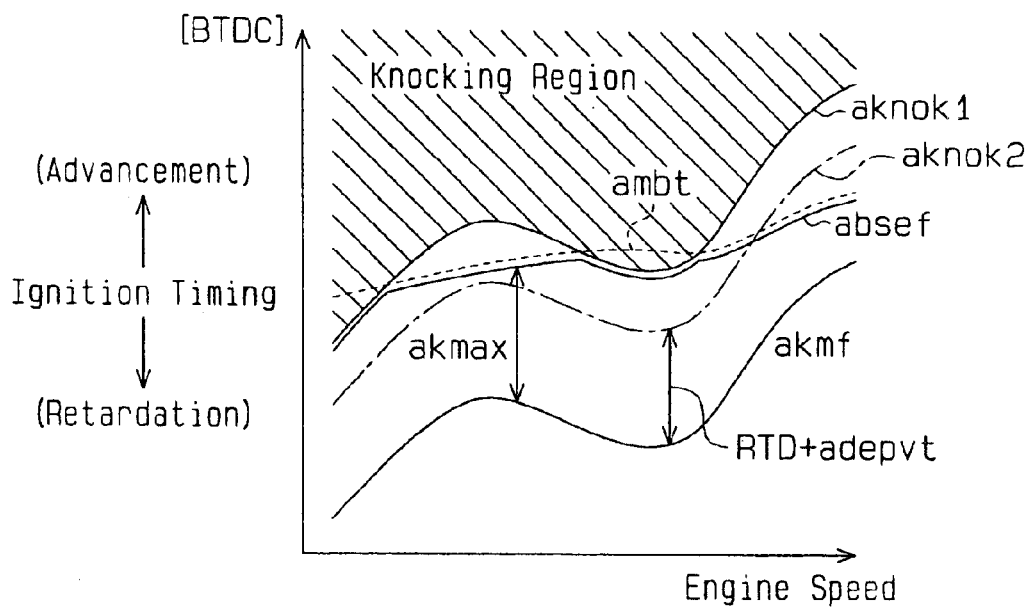
FIG. 3 is a graph showing the relationship between an MBT point and a knock limit point and the most retarded ignition timing with respect to an engine speed.

FIG. 3 shows the relationship between the engine speed ne and each of the maximum advanced ignition timing absef, maximum retarded ignition timing akmf, maximum retardation amount akmax, and others, in which deposits described above is not occurring. As shown in this figure, these values vary with the engine speed in a knocking region in which knocking exceeds the allowable level. In the present embodiment, when deposits start to be deposited, the setting of the valve timing for the intake valve 12 provided by the variable valve timing mechanism 11 is correspondingly changed. This correspondingly changes the above set values.

(Calculation of Required Ignition Period afin)

The required ignition timing afin is calculated by determining a ignition timing retardation amount aknk that is the retardation amount of the required ignition timing afin with respect to the maximum advanced ignition timing absef. The value of the ignition timing retardation amount aknk is set on the basis of the maximum retardation amount akmax, a KCS learning value agknk, and a KCS feedback correction value akcs as shown in Equation (4).

$$aknk=akmax-agknk+akcs \quad (4)$$

Then, as shown in Equation (5) below, the required ignition timing afin is set by subtracting the ignition timing retardation amount aknk from the maximum advanced ignition timing absef. That is, the required ignition timing afin is obtained by advancing the maximum retarded ignition timing akmf by the KCS learning value agknk and retarding it by the KCS feedback correction value akcs as shown in Equation (6) below. An upper limit value and a lower limit value are set for the required ignition timing afin so that it increases above the maximum advanced ignition timing absef or decreases below the maximum retarded ignition timing akmf.

$$afin=absef-aknk \quad (5)$$

$$afin=akmf+agknk-akcs \quad (6)$$

The KCS feedback correction value akcs is set in accordance of the occurrence of knocking detected by the knock sensor 15. Specifically, if it is determined that the detected magnitude of knocking is greater than a predetermined determination value and is thus equal to or lower than the allowable level, the KCS feedback correction value akcs is gradually reduced. On the other hand, if the detected magnitude of knocking is equal to or greater than the determination value, the KCS feedback correction value akcs is increased by a predetermined value.

On the other hand, if the absolute KCS feedback correction value akcs remains greater than a predetermined value (|akcs|>A) for a predetermined time or longer the KCS feedback correction value akcs is updated so that its absolute value decreases gradually. Specifically, if the KCS feedback correction value akcs remains greater than a certain positive value (akcs>A), a predetermined value B is subtracted from the KCS learning value agknk. Furthermore, the predetermined value B is also subtracted from the KCS feedback correction value akcs. On the other hand, if the KCS feedback correction value akcs remains less than a certain negative value (akcs<-A), the predetermined value B is added to each of the KCS learning value agknk and KCS feedback correction value akcs. The thus updated KCS learning value agknk is stored in a backup memory of the electronic control unit 16. This value is retained even while the engine is stopped.

During knock control, a rate learning value rgknk is updated in accordance with the occurrence of knocking. The rate learning value rgknk is set as an index value indicative of the degree of deposits to the internal combustion engine 10 described above. In this case, the state in which no deposits collect in the internal combustion engine is set to a value 0. The state in which the amount of deposits reaches an assumed maximum value is set to a value 1. Thus, the degree of deposits is expressed by the rate learning value rgknk.

The rate learning value rgknk is set to 0 as an initial value before shipment, that is, when no deposits collects in the internal combustion engine. Subsequently, the rate learning value rgknk increases or decreases gradually in accordance with the incidence of knocking within the range from 0 to 1, inclusive. Specifically, the rate learning value rgknk is gradually increased consistently with the incidence of knocking. The rate learning value rgknk is gradually reduced consistently with the incidence of knocking. Like the KCS learning value agknk, the updated rate learning value rgknk is stored in the backup memory of the electronic control unit 16. This value is retained even while the engine is stopped.

Figure 4:
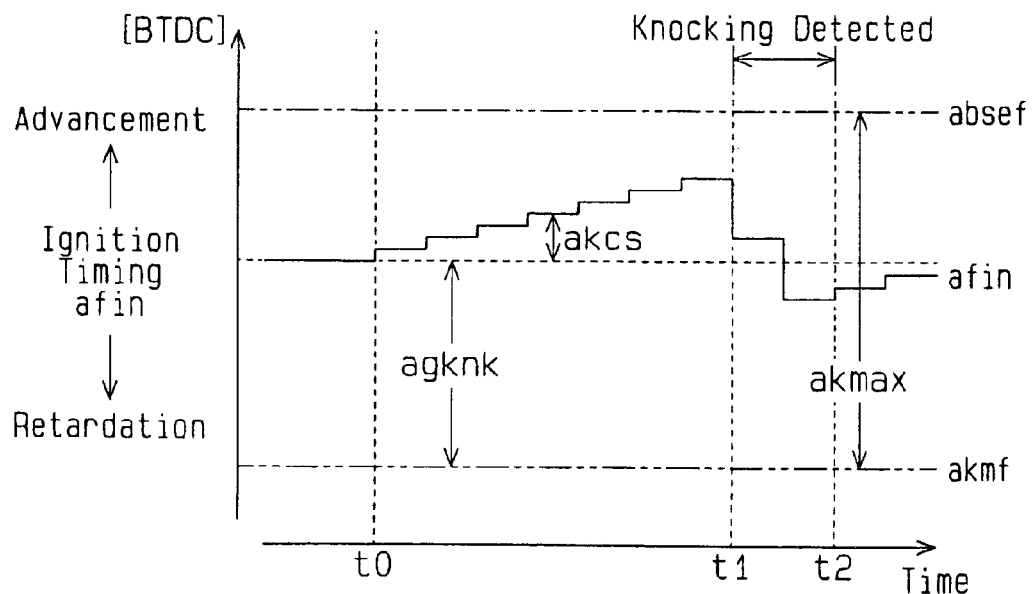
FIG. 4 is a time chart showing an example of knock control.

FIG. 4 shows an example of the manner of such knock control. In the illustrated example, the adjustment of the ignition timing is started at a time t0 in accordance with the occurrence of knocking on the basis of knock control. When the knock control is started, the KCS feedback correction value akcs has been set to 0, which is its initial value. The required ignition timing afin has been set to a value obtained by advancing the maximum retarded ignition timing akmf by the KCS learning value agknk.

In the illustrated example, during the period between the time t0, at which the knock control is started, and a time t1, the occurrence of knocking at a level equal to or higher than the determination value is not detected. Thus, the KCS feedback correction value akcs is gradually reduced from the initial value 0, set at the start of the knock control. Accordingly, after the time t0, the required ignition timing afin is gradually advanced.

Subsequently, after the time t1, every time the occurrence of knocking at a level equal to or higher than the determination value is detected, the KCS feedback correction value akcs is increased by a predetermined value in increments. Thus, while the occurrence of such knocking is continually detected, the required ignition timing afin is advanced in increments of a predetermined time.

Subsequently, after a time t2, once the detection of occurrence of knocking is stopped, the KCS feedback correction value is gradually reduced. The required ignition timing afin is thus gradually advanced.

The above knock control advances the required ignition timing afin so as to obtain a larger torque, to the extent that knocking exceeding the allowable level does not occur.

<2> Setting VVT Advancement Amount

On the other hand, in the present embodiment, the electronic control unit 16 determines the magnitude of a change in the required ignition timing afin made to deal with deposits in the internal combustion engine 10, on the basis of the results of the knock control. Then, on the basis of the magnitude of the variations, the electronic control unit 16 changes the settings of the valve timing for the intake valve 12 provided by the variable valve timing mechanism 11.

Specifically, in accordance with an increase in the amount of collecting deposits, the electronic control unit 16 limits the advancement amount for the valve timing for the intake valve 12 provided by the variable valve timing mechanism 11, that is, maintains the valve timing at a value of retardation. This serves to reduce the actual compression ratio to suppress an increase in in-cylinder compression pressure caused by deposits. As a result, a favorable burning state is maintained.

Figure 5:
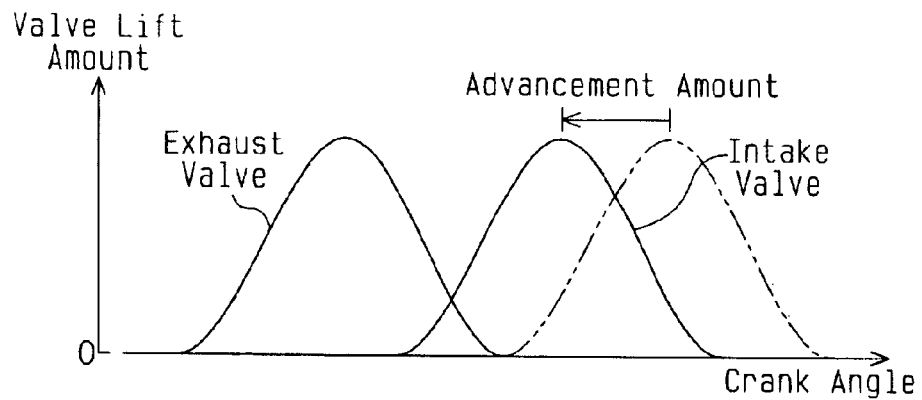
FIG. 5 is a graph showing an example of valve timing control.
Figure 6:
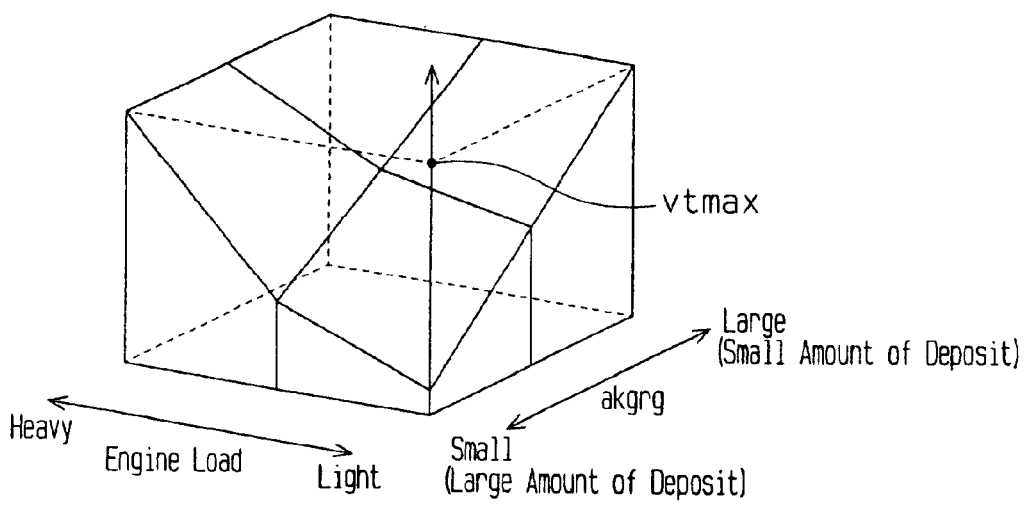
FIG. 6 is a diagram showing an example of a calculation map for an upper limit VVT advancement amount.

With reference to FIGS. 5 and 6, a detailed description will be given of the valve timing control according to the present embodiment.

FIG. 5 shows an example of the manner executed by the variable valve timing mechanism 11 to variably set the valve timing. In the present embodiment, the valve timing for the intake valve 12, which can be varied by the variable valve timing mechanism 11, is expressed as an advancement amount [°CA] with reference to the retardation limit (0) of the variable setting range of the valve timing for the intake valve 12, shown by the alternate long and two short dashes line in the figure. In the present embodiment, the advancement amount for the valve timing for the intake valve 12 is a parameter corresponding to a "set value of the valve actuation of the engine valve in the variable valve actuation control".

(Calculation of Deposit Required Ignition Period akgrg)

In the valve timing control according to the present embodiment, the deposit required ignition timing akgrg is first calculated on the basis of the KCS learning value agknk and rate learning value rgknk, set for the above knock control. The value of the deposit required ignition timing akgrgr is the index value of the present required ignition timing afin retarded to deal with deposits (precisely speaking, the advancement amount for the present required ignition timing with respect to the maximum retarded ignition timing akmf).

To calculate deposit required ignition timing akgrg, the deposit ignition timing retardation amount adep is first, determined by multiplying the rate learning value rgknk by maximum ignition timing retardation amount DLAKNOK as shown in Equation (7) below. The maximum ignition timing retardation amount DLANKNOK is a constant for the retardation amount for the required ignition timing required to deal with the assumed maximum amount of deposits under predetermined engine operating conditions under which the effect of the deposits is most marked. This value is predetermined through experiments or the like. The level of the effect of the deposits on the required ignition timing afin, that is, the retardation amount for the required ignition timing afin required to deal with the deposits, varies depending on the engine speed ne.

$$adep = DLAKNOK \times rgknk \quad (7)$$

As shown in Equation (8) below, the deposit required ignition timing akgrg is calculated by subtracting the deposit ignition timing retardation amount adep from the KCS learning value agknk.

$$akgrg = agknk - adep \quad (8)$$

As the amount of deposits increases to increase the amount of retardation of the required ignition timing afin executed to deal with the deposits, the thus calculated deposit required ignition timing akgrg is further retarded, that is, has a smaller value. Thus, the value of the deposit required ignition timing akgrg can be used as the index value of the amount of deposits.

In the present embodiment, the amount of retardation of the required ignition timing afin executed to deal with the deposits is reflected in the maximum retardation amount akmax using the deposit correction item adepvt. Thus, in the present embodiment, the KCS learning value is the index value of the magnitude of a change in required ignition timing afin made to deal with a factor other than the deposits.

In the present embodiment, as shown in Equation (8) above, the deposit required ignition timing akgrg, obtained by subtracting the deposit ignition timing retardation amount adep from the KCS learning value agknk, is the index value of the present required ignition timing afin retarded to deal with the deposits. That is, the value of the deposit required ignition timing akgrg enables the determination of the magnitude of a change in ignition timing made to deal with the deposits to the present internal combustion engine 10.

(Calculation of VVT Advancement Amount vt)

Subsequently, a target VVT advancement amount vtt that is a control target value for the valve timing for the intake valve 12 is calculated on the basis of the deposit required ignition timing akgrg determined as described above.

First, as shown in Equation (9) below, an upper limit VVT advancement amount vtlmt is determined on the basis of the deposit required ignition timing akgrg and a throttle opening degree ta that is the index value of an engine load. The upper limit VVT advancement amount vtlmt is set as the advancement side limit value of the setting range of the target VVT advancement amount vtt.

$$vtlmt=f_1(akgrg,ta) \qquad (9)$$

In this case, the value of the upper limit VVT advancement amount vtlmt is set as described below.

As the amount of deposits increases, the substantial volume of the combustion chamber 13 decreases to increase the in-cylinder compression pressure during burning. This increases the possibility of knocking. On the other hand, the normal valve timing for the intake valve 12 is set for the period in which an intake efficiency is highest.

By reducing the present allowable setting range of the target VVT advancement amount vtt to retard the valve timing for the intake valve 12 compared to the inherent set period, it is possible to reduce the intake efficiency and thus the actual compression ratio. Consequently, the in-cylinder compression pressure during burning can be reduced. Thus in the present embodiment, when the deposit required ignition timing akgrg has decreased to indicate that the amount of deposits has increased, the value of the upper limit VVT advancement amount vtlm is reduced to narrow the allowable setting range of the target VVT advancement amount vtt.

However, when a heavy load is being imposed on the engine and a large amount of air is being taken in, the in-cylinder compression pressure during burning is high. Accordingly, the effect of the deposits is relatively insignificant. Thus, when the engine load is heavy, the magnitude of a reduction in upper limit VVT advancement amount vtlmt carried out to cope with the reduced value of the deposit required ignition timing akgrg is reduced compared to the case in which the engine load is light.

FIG. 6 shows an example of a calculation map used to calculate the upper limit VVT advancement amount vtlmt as described above. As shown in this figure, when the deposit required ignition timing akgrgr has a large value to indicate that almost no deposits are present, the value of the upper limit VVT advancement amount vtlmt is set at a maximum advancement amount vtmax that is the advancement side limit of the variable setting range of the valve timing for the intake valve 12 provided by the variable valve timing mechanism 11. In contrast, when the deposit required ignition timing akgrgr has a small value to indicate that the amount of deposits has increased, the value of the upper limit VVT advancement amount vtlmt is set at as small a value as that set when the engine load is light.

Moreover, when the target VVT advancement amount vtt is calculated, not only the upper limit VVT advancement amount vtlmt but also a base VVT advancement amount vtbase are calculated. The value of the base VVT advancement amount vtbase is set as a control target value for the optimum valve timing for the intake valve 12 used when no deposits collect in the internal combustion engine. In this case, the base VVT advancement amount vtbase is calculated on the basis of the engine speed ne and engine load (in this case, the throttle opening degree ta is used as the index value of the engine load) as shown in Equation (10) below.

$$vtbse=f_2(ne,ta) \qquad (10)$$

Then, as shown in Equation (11) below, one of the calculated upper limit VVT advancement amount vtlm and base VVT advancement amount vtbase which is closer to the point of most significant retardation is set as the target VVT advancement amount vtt.

$$vtt=\min(vtlmt,vtbse) \qquad (11)$$

The electronic control unit 16 controls the variable valve timing mechanism 11 using the thus calculated target VVT advancement amount vtt as a control target value for the valve timing for the intake valve 12. Specifically, the variable valve timing mechanism 11 is controlled so as to make an actual VVT advancement amount vt equal to the calculated target VVT advancement amount vtt, the actual VVT advancement amount vt being the measured value of the advancement amount for the valve timing for the intake valve 12 determined from the results of detections by the crank sensor 17 and cam sensor 18. Thus, the valve timing for the intake valve 12 is controlled so as to reduce the effect of the deposits to retain a favorable burning state.

<3> Details of Ignition Timing Setting Control in Accordance with Valve Timing Setting Once the valve timing for the intake valve 12 is thus changed, the optimum ignition timing is correspondingly changed. For example, if the valve timing for the intake valve 12 is retarded, the valve overlap between the intake valve and the exhaust valve decreases to reduce the amount of internal EGR present in the cylinder during burning. Accordingly, if the valve timing for the intake valve 12 is retarded, the speed of burning in the cylinder increases to retard the optimum ignition timing.

Figure 7:
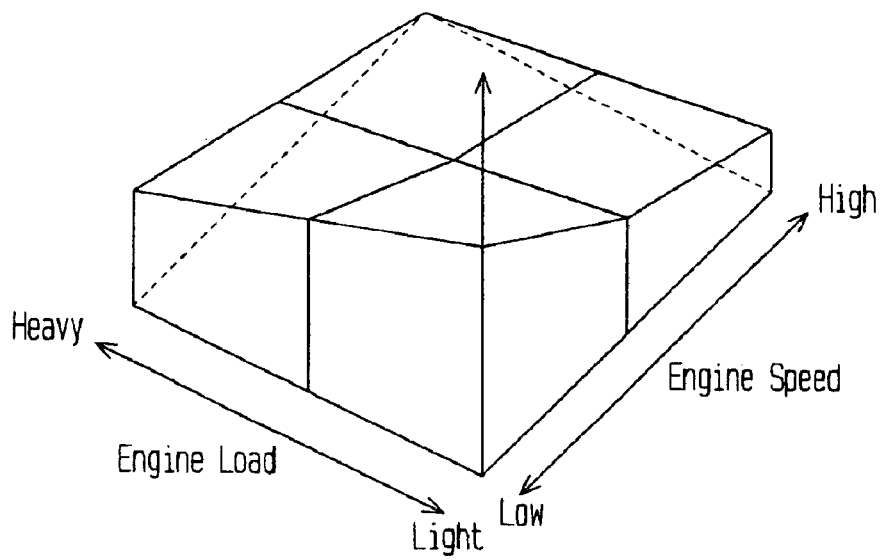
FIG. 7 is a diagram showing an example of a calculation map for a base second knock limit point.
Figure 8:
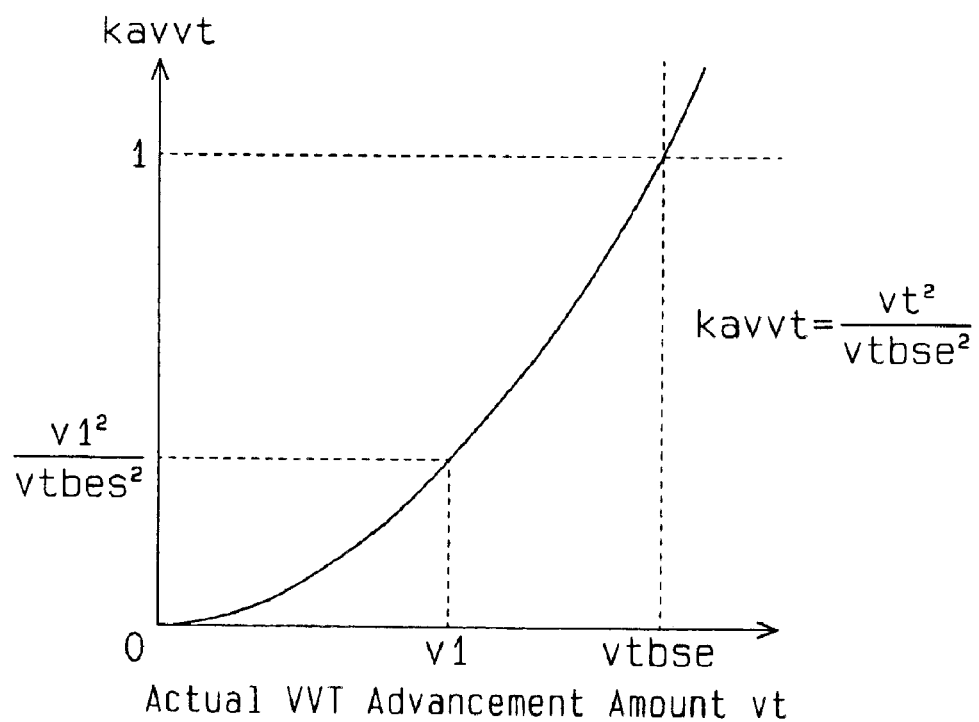
FIG. 8 is a graph showing the relationship between a VVT advancement correction factor and a actual VVT advancement amount.
Figure 9:
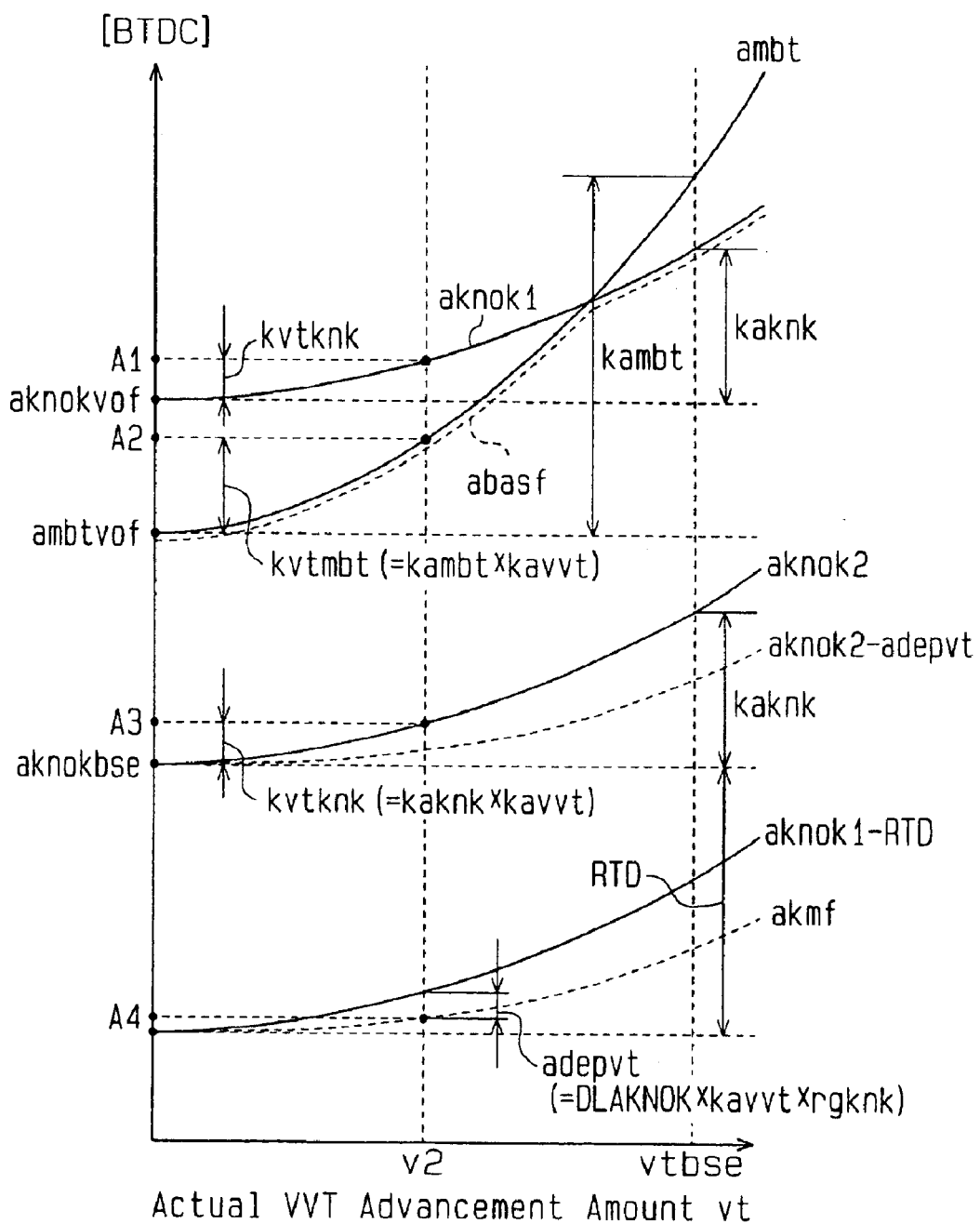
FIG. 9 is a graph showing the relationship between parameters relating to ignition timing setting control and the actual VVT advancement amount.

In the present embodiment, the required ignition timing afin and others are set as described below to obtain the optimum ignition timing regardless of changes in the valve timing for the intake valve 12. With reference to FIGS. 7 to 9, a detailed description will be given of ignition timing setting control according to the present invention (Calculation of Base MBT Point and Base Knock Limit Point)

In the present embodiment, for the ignition timing setting control, a base MBT point ambtvof, a first base knock limit point aknokvof, and a second base knock limit point aknokbse are calculated.

The base MBT point ambtvof indicates a ignition timing with which the maximum torque is obtained at the present values of the engine speed and engine load when the valve timing for the intake valve 12 is set at the position of the most significant retardation in the allowable setting range.

The first base knock limit point aknokvof indicates the advancement limit value of the ignition timing which enables knocking to be reduced to an allowable level or lower, the knocking possibly occurring at the present values of the engine speed ne and engine load when the valve timing for the intake valve 12 is set at the position of the most significant retardation in the allowable setting range. The second base knock limit point aknokbse indicates the advancement limit value of the ignition timing which enables knocking to be reduced to an allowable level or lower, the knocking possibly occurring at the present values of the engine speed ne and engine load when the above low-octane-number fuel is used and when the valve timing for the intake valve 12 is set equal to the position of the most significant retardation in the allowable setting range. These calculated values are used as base values to calculate the MBT point ambt, first knock limit point aknok1, and second knock limit point aknok2.

In the present embodiment, the base MBT point ambtvof, first knock limit point aknokvof, and second knock limit point aknokbse are calculated as functions of the engine speed ne and engine load as shown in Equations (11) to (13) below. In the present embodiment, the throttle opening degree ta is used as the index value of the present engine load.

$$ambtvof = f_3(ne, ta) \tag{12}$$

$$aknokvof = f_4(ne, ta) \tag{13}$$

$$aknokbse = f_5(ne, ta) \tag{14}$$

FIG. 7 shows an example of a calculation map used to calculate the second base knock limit point aknokbse. As shown in this figure, as the engine speed ne and the engine load increase, the second base knock limit point aknokbse is set at a smaller value. A similar calculation map is used to set the base MBT point ambtvof and the first base knock limit point aknokvof. In spite of different set values, these calculation maps exhibit similar tendencies in terms of the engine speed ne and engine load. The second base knock limit point aknokbse may be set at a smaller value as the engine speed ne decreases.

(Calculation of VVT Advancement Correction Coefficient kavvt)

Then, a VVT advancement correction coefficient kavvt is calculated on the basis of the present valve timing (actual VVT advancement amount vt). The VVT advancement correction coefficient kavvt indicates the ratio of a value X to a value Y (X/Y).

Value X: difference in the internal EGR amount of the internal combustion engine 10 between the case in which the valve timing for the intake valve 12 is at the present value (actual VVT advancement amount vt) and the case in which it is at the position of the most significant retardation.

Value Y: difference in the internal EGR amount of the internal combustion engine 10 between the case in which the valve timing for the intake valve 12 is set equal to the base VVT advancement amount vtbse and the case in which it is at the position of the most significant retardation.

On the other hand, it has been confirmed that the amount of internal EGR present in the cylinder during burning when the engine speed ne and the engine load have specific values is almost proportional to the square of the amount of valve overlap between the intake valve and the exhaust valve. On the other hand, with the variable valve timing mechanism 11 according to the present embodiment, the variable range of the intake valve 12 is set so that the amount of valve overlap between the intake valve and the exhaust valve is 0 when the actual VVT advancement amount vt is 0 as shown in FIG. 5. Thus, in the internal combustion engine 10, with the specific engine speed ne and engine load, the internal EGR amount is proportional to the square of the advancement amount for the valve timing for the intake valve 12. Thus, in the present embodiment, the VVT advancement correction coefficient kavvt is determined on the basis of Equation (15) below.

$$kavvt = \frac{vt^2}{vtbse^2} \tag{15}$$

FIG. 8 shows the relationship between the actual VVT advancement amount vt and the VVT advancement correction coefficient kavvt. As shown in this figure, the VVT advancement correction coefficient kavvt is proportional to the square of the value of the actual VVT advancement amount vt. Furthermore, when the actual VVT advancement amount vt is equal to the base VVT advancement amount vtbse, the VVT advancement correction coefficient kavvt has a value of 1. As shown in FIG. 8, when the actual VVT advancement amount vt has a predetermined value v1, the value of the VVT advancement correction coefficient kavvt is the square of the ratio (v1/vtbse) of the predetermined value v1 to the base VVT advancement amount vtbse.

In the present embodiment, the VVT advancement correction coefficient kavvt is a parameter corresponding to the square of the ratio of the set value of the valve timing after a change based on the magnitude of a change in ignition timing made to deal with deposits to the set value before the change. The valve timing before the change corresponds to the valve timing in a state where there is no deposit. That is, the VVT advancement correction coefficient kavvt is proportional to the square of the ratio of the set value of the valve timing that has been changed based on the magnitude of a change in the ignition timing to the set value of the valve timing in a state where there is no deposit.

(Calculation of MBT Point and Knock Limit Point)

On the other hand, in the present embodiment, not only the VVT advancement correction coefficient kavvt is calculated but also a base MBT point difference kambt and a base knock limit point difference kaknk are determined. The base MBT point difference kambt and the base knock limit point difference kaknk indicate a difference in MBT point and a difference in knock limit point, respectively, between the case in which at the present values of the engine speed ne and engine load, the valve timing of the intake valve 12 is set equal to the base VVT advancement amount vtbse and the case in which at the present values of the engine speed ne and engine load, the valve timing of the intake valve 12 is set at the position of the most significant retardation.

The values of the base MBT difference kambt and base knock limit point difference kaknk at each engine speed ne and engine load can be predetermined through experiments or the like. Accordingly, as shown in Equations (16) and (17) below, the base MBT difference kambt and the base knock limit point difference kaknk are determined as functions of the engine speed ne and engine load (in this case, the throttle opening degree ta is used as an index value).

$$kambt = f_6(ne, ta) \tag{16}$$

$$kaknk = f_7(ne, ta) \tag{17}$$

As described above, with the variable valve timing mechanism 11 according to the present embodiment, when the advancement amount is 0, the amount of valve overlap between the intake valve and the exhaust valve is 0, with the internal EGR amount almost 0. Accordingly, the base MBT difference kambt and base knock limit point difference kaknk calculated herein are advancement correction amounts at the MBT point and knock limit point corresponding to the internal EGR amount observed when the base VVT advancement amount vtbase is set at the present values of the engine speed ne and engine load.

On the other hand, the advancement correction amounts at the MBT point and knock limit point can be considered to be proportional to the internal EGR amount. Consequently, the advancement correction amount kvtmbt at the MBT point and the advancement correction amount kvtknk at the knock limit point both corresponding to the present valve timing (actual VVT advancement amount vt) for the intake valve 12 can be expressed by Equations (18) and (19) below.

$$kvtmbt = kambt \times kavvt \quad (18)$$

$$kvtknk = kaknk \times kavvt \quad (19)$$

Therefore, the MBT point ambt, first knock limit point aknok1, and second knock limit point aknok2 corresponding to the present valve timing (actual VVT advancement amount vt) for the intake valve 12 can be determined using Equations (20) to (22) below.

$$ambt = ambtvof + kvtmbt \quad (20)$$

$$aknok1 = aknokvof + kvtknk \quad (21)$$

$$aknok2 = aknokbse + kvtknk \quad (22)$$

(Calculation of Maximum Retarded Ignition Timing akmf)

Moreover, as described above, in the present embodiment, after the MBT point ambt, the first knock limit point aknok1, and the second knock limit point aknok2 have been calculated, the most retarded ignition timing akmf is calculated on the basis of Equation (2), shown above.

As described above, the deposit ignition timing advancement amount adep, determined using Equation (7), shown above, is an index value indicative of the advancement amount for the required ignition timing afin corresponding to the effect of the deposits. Thus, the maximum retarded ignition timing akmf reflecting the effect of the deposits can also be determined by using the deposit correction term adepvt as the value of the deposit ignition timing retardation amount adep in Equation (7), shown above.

The level of the effect of the deposits on the maximum retarded ignition timing varies with the present set valve timing. Thus, in the present embodiment, the deposit correction term adepvt is set as a value obtained by multiplying the deposit ignition timing retardation amount adep by the VVT advancement correction coefficient kavvt as shown in Equation (23) below. Consequently, in the present embodiment, the maximum retarded ignition timing akmf is calculated on the basis of Equation (24) below.

$$adepvt = DLAKNOK \times kavvt \times rgknk \quad (23)$$

$$akmf = aknok2 - DALKNOK \times kavvt \times rgknk - RTD \quad (24)$$

FIG. 9 shows the relationship between the parameters (MBT point ambt, first knock limit point aknok1, second knock limit point aknok2, and maximum retarded ignition timing akmf) relating to the ignition timing setting control and the actual VVT advancement amount vt observed when the engine speed ne and the engine load are set at specific values. As shown in this figure, the values of the MBT point ambt, first knock limit point aknok1, second knock limit point aknok2, and maximum retarded ignition timing akmf vary depending on the actual VVT advancement amount vt. For example, as shown in FIG. 9, when the actual VVT advancement amount has a value v2, the MBT point ambt is set at a value A2. Furthermore, the first knock limit point aknok1 and the second knock limit point aknok2 are set at values A1 and A3, respectively. Moreover, the present maximum retarded ignition timing akmf is set at a value A4.

Then, as shown above in Equations (3) to (5) and other equations, the final required ignition timing afin is set on the basis of the thus set MBT point ambt, first knock limit point aknok1, and maximum retarded ignition timing akmf, as well as the above described KCS learning value agknk and KCS feedback correction value akcs. Thus, the required ignition timing afin is corrected to the appropriate value corresponding to a change in target VVT advancement amount vtt corresponding to the amount of deposits as described above.

The above described present embodiment can produce the advantages effects described below.

(1) In the present embodiment, the deposit required ignition timing akgrg, the index value of the magnitude of the present change in required ignition timing made to deal with the deposit of deposits, is determined on the basis of the KCS learning value agknk and rate learning value rgknk, set through the knock control of the ignition timing. The deposit required ignition timing akgrg is determined on the basis of the deposit ignition timing retardation amount adep, the index value of the difference in required ignition timing afin between the case in which no deposits are present under the predetermined engine operating conditions under which the deposits produces a marked adverse effect and the present case in which deposits are collecting in the internal combustion engine.

Then, in the present embodiment, on the basis of the deposit required ignition timing, the upper limit of the target VVT advancement amount is determined to reduce the allowable variable range of the valve timing for the intake valve 12. The level of deposits can be easily and properly determined on the basis of the deposit required ignition timing akgrg. Thus, the appropriate valve timing is set for the intake valve 12 in accordance with the deposits in the internal combustion engine 10. This makes it possible to more effectively avoid possible problems resulting from the deposits.

(2) In the present embodiment, the MBT point ambt, first knock limit point aknok1, and second knock limit point aknok2 of the ignition timing are corrected in accordance with the actual VVT advancement amount vt, varied on the basis of the deposit required ignition timing. Moreover, through this correction, the maximum advanced ignition timing absef and the maximum retarded ignition timing akmf as well as the required ignition timing afin are corrected in accordance with the actual VVT advancement amount. Thus, the required ignition timing afin can be set at the appropriate value regardless of, for example, a change in internal EGR amount accompanying a change in valve timing for the intake valve 12 corresponding to deposits in the internal combustion engine 10.

(3) In the present embodiment, when the MBT point ambt, first knock limit point aknok1, and second knock limit point aknok2 of the ignition timing are corrected in accordance with the actual VVT advancement amount vt, the correction amounts are determined using the VVT advancement correction coefficient kavvt, determined on the basis of Equation (15), shown above. Specifically, the correction amounts are determined to be proportional to the square of the ratio of the set value of the valve timing after a change based on the magnitude of a change in ignition timing made to cope with the deposits to the set value before the change. Consequently, the MBT point ambt, first knock limit point aknok1, and second knock limit point aknok2 of the ignition timing, as well as the maximum advanced ignition timing absef, the maximum retarded ignition timing akmf, and the required ignition timing afin can be properly corrected in accordance in variations in internal EGR amount.

(4) In the present embodiment, the maximum advanced ignition timing absef or maximum retarded ignition timing akmf, the base of the adjustment of the required ignition timing afin based on the knock control in accordance with the occurrence of knocking, is corrected in accordance with the actual VVT advancement amount vt. Thus, the KCS learning value agknk reflects only changes in ignition timing afin made to deal with a factor other than deposits. Consequently, the KCS learning value agknk can be kept valid regardless of variations in the level of effect of the deposits on the required ignition timing afin.

As described above, the level of the effect of the deposits varies depending on the engine operating conditions (engine speed ne, engine load, and the like). Accordingly, if the KCS learning value reflects the effect of the deposits, the KCS learning value agknk may be made inappropriate not only by variations in the amount of deposits but also by changes in engine operating conditions. This may affect the knock control. In contrast, in the present embodiment, the KCS learning value agknk can be kept valid regardless of variations in the level of effect of the deposits resulting from variations in the amount of deposits or changes in engine operating conditions. Therefore, the above problems can be favorably avoided.

The above described first embodiment may be modified as described below.

In the above embodiment, the values are calculated using the throttle opening degree ta as the index value of the engine load. However, the values may be calculated using the amount of injected fuel, the amount of intake air ga, an engine load ratio kl, or the like as the index value of the engine load ratio.

In the present embodiment, the maximum retarded ignition timing akmf is calculated by multiplying the deposit ignition timing retardation amount adep by the VVT advancement correction coefficient kavvt and setting the value obtained as the deposit correction term adepvt. However, provided that a change in the level of effect of the deposits on the maximum retarded ignition timing akmf which variation follows a change in valve timing is sufficiently allowable, the maximum retarded ignition timing akmf may be calculated using the value of the deposit ignition timing retardation amount adep as the deposit correction term adepvt as described above. In this case, tho maximum retarded ignition timing akmf is calculated as shown in Equation (25) below.

$$akmf = aknok2 - adep\text{-}RTD = aknok2 - DLAKNOK \times rgknk\text{-}RTD \quad (25)$$

In the above embodiment, the advancement correction amounts kvtmbt and kvtknk for the MBT point and knock limit point are determined on the basis of Equations (18) and (19), shown above, using the VVT advancement correction coefficient kavvt, determined on the basis of Equation (15), shown above. The advancement correction amounts kvtmbt and kvtknk may be calculated using a calculation map based on the prestored engine speed ne and actual VVT advancement amount vt. In such an aspect, the advancement correction amounts kvtmbt and kvtknk may be calculated by, for example, determining the relationship between the engine speed ne or actual VVT advancement amount vt and the appropriate value of the advancement correction amount for it and storing this relationship in the memory of the electronic control unit 16 as a calculation map.

In the above embodiment, the required ignition timing afin is corrected to the appropriate value in accordance with the present valve timing setting by correcting the MBT point and knock limit point of the ignition timing, as well as the maximum advanced ignition timing and maximum retarded ignition timing in accordance with the actual VVT advancement amount vt. Of course, the required ignition timing afin can be set at the appropriate value in accordance with the present valve timing setting by directly correcting the required ignition timing afin in accordance with the actual VVT advancement amount vt.

In the above embodiment, the target VVT advancement amount vtt is changed in accordance with deposits by determining the upper limit of the target VVT advancement amount vtt using the upper limit VVT advancement amount vtlmt, calculated on the basis of the deposit required ignition timing akgrg. The manner of changing the target VVT advancement amount vtt may be changed as necessary. For example, the target VVT advancement amount vtt may be determined by multiplying the base VVT advancement amount vtbse by a coefficient set in accordance with the deposit required ignition timing akgrg or by correcting the base VVT advancement amount vtbse using a correction amount set in accordance with the deposit required ignition timing. In such a case, the target VVT advancement amount vtt can be similarly changed in accordance with deposits.

In the above embodiment, the target VVT advancement amount vtt is changed on the basis of the deposit required ignition timing akgrg, and on the basis of the correspondingly changed actual VVT advancement amount vt, the required ignition timing afin is corrected. However, the target VVT advancement amount vtt alone may be changed without correcting the required ignition timing afin. In this case, the valve timing setting can also be properly adjusted in accordance with the determined level of deposits.

In the above embodiment, calculation logic for the required ignition timing afin is constructed so that the KCS learning value will not reflect the effect of the deposits. Accordingly, apart from the KCS learning value agknk, the rate learning value rgknk is learned in accordance with the occurrence of knocking. Then, both learning values are used to determine the deposit required ignition timing akgrg. If the calculation logic for the required ignition timing afin is constructed so that the KCS learning value reflects the effect of the deposits, the deposit required ignition timing akgrg can be determined directly from the KCS learning value agknk.

The target VVT advancement amount vtt may also be changed on the basis of the magnitude or rate of a change in ignition timing based on the effect of the deposits, which magnitude or rate is determined in place of the deposit required ignition timing akgrg, changed in accordance with the effect of the deposits. In this case, the valve timing can also be properly set in accordance with the state of the deposits.

Even in an internal combustion engine that variably controls the valve timing for the exhaust valve or that variably controls a valve actuation other than the valve timing, such as the valve lift amounts of the engine valves or a cam working angle, the appropriate set value of the valve actuation during the variable valve actuation control may vary depending on deposits. In such an internal combustion engine, if the set value of the valve actuation is changed, the appropriate value of the ignition timing is correspondingly changed. Thus, the present invention is also applicable to such an internal combustion engine as variably controls the valve actuation, in a manner similar to or in conformity to the above embodiment. This application can produce advantages similar to those of the above embodiment.

(Second Embodiment)

A control apparatus for an internal combustion engine according to a second embodiment of the present invention will now be described below with reference to FIGS. 10 to 15. The differences from the first embodiment will be mainly discussed.

In the first embodiment, the variable valve actuation control and the ignition timing control are coordinated by changing the valve actuation set value (actual VVT advancement amount vt) for the variable valve actuation control in accordance of the magnitude of a change in ignition timing made by the knock control to deal with deposits, while readjusting the knock limit point or the like in accordance with the change in valve actuation set value. Furthermore, in the first embodiment, the above readjustment is carried out considering that the effect of a change in valve actuation set value on the knock limit point is mainly produced by a change in burning state corresponding to a change in internal EGR amount accompanying the change in valve actuation set value. Theoretically, the magnitude of the change in internal EGR amount following the change in valve actuation set value is proportional to the square of the valve overlap amount. Accordingly, in the first embodiment, for the above readjustment, the correction amount for the knock limit point is determined to be a value proportional to the square of the valve overlap amount (see FIGS. 8 and 9).

Once the valve actuation set value is changed, a substantial intake temperature (the temperature of a gas in the cylinder at the end of an intake cycle), an actual compression ratio, and the like are affected in addition to the internal EGR amount. The inventors' investigations have indicated that such a change may affect the occurrence of knocking. If the effect, on the occurrence of knocking, of a change in intake temperature or actual compression ratio accompanying a change in valve actuation set value is not negligible, it may be difficult to optimize the ignition timing control simply by correcting the knock limit point or the like as in the case of the first embodiment.

The solid line in FIG. 10(a) shows an example of the manner in which the internal EGR amount varies depending on the valve timing (actual VVT advancement amount vt) for the intake valve 12. As described above, it has been confirmed that the internal EGR amount is proportional to the square of the valve overlap amount. Accordingly, in the internal combustion engine 10, when the actual VVT advancement amount vt is 0 and the valve overlap amount is thus smallest, the internal EGR amount is smallest. In accordance with an increase in valve overlap amount accompanying the advancement of the valve timing for the intake valve 12, the internal EGR amount increases substantially in proportion to the square of the valve overlap amount. Here, an increase in internal EGR amount degrades the burning state to reduce the possibility of knocking as described above. Accordingly, if attention is paid only to variations in internal EGR amount, the knock limit point varies with respect to the valve timing as shown by the solid line in FIG. 10(b). Specifically, as the valve timing for the valve 12 is further advanced in response to the change in internal EGR amount, the knock limit point is shifted toward the retardation side.

The inventors' investigations indicate that in some operation regions such as light load regions, the internal EGR amount tends to be smallest when the valve timing for the intake valve 12 is slightly advanced as shown by the broken line in FIG. 10(a) to ensure an appropriate valve overlap period (about 10°CA). This is assumed to be because the presence of the appropriate valve overlap period facilitates the scavenging of the cylinder to reduce the amount of burned gas remaining in the cylinder rather than being exhausted. Consequently, in such operation regions, variations in knock limit point caused by variations in internal EGR amount with respect to the valve timing for the intake valve 12 are as shown by the broken line in FIG. 10(b).

On the other hand, an increase in valve overlap amount increases the amount of burned gas blown from an exhaust system back into the cylinder. Accordingly, the substantial intake temperature tends to increase consistently with the valve overlap amount. Furthermore, the advancement of the valve timing for the intake valve 12 causes the intake valve 12 to be closed earlier. This increases the actual compression ratio. Consequently, the intake temperature and the actual compression ratio increase as the valve timing for the intake valve 12 is advanced as shown in FIG. 10(c). An increase in intake temperature or actual compression ratio increases the possibility of knocking. Thus, in connection with variations in intake temperature and actual compression ratio, the knock limit point is shifted toward the retardation side as the valve timing for the intake valve 12 is further advanced as shown in FIG. 10(d).

In view of the effect of variations in internal EGR amount and the effect of variations in intake temperature and actual compression ratio in total, the knock limit point tends to vary in a quadratic curve form with a bottom point P at the point of a predetermined valve timing $\alpha$ with respect to the valve timing for the intake valve 12 as shown in FIG. 10(e). That is, as the valve timing for the intake valve 12 is varied from the position of the most significant retardation toward the advancement side, the knock limit point is shifted toward the retardation side until the valve timing is reached the predetermined valve timing $\alpha$. Then, once the valve timing is advanced beyond the predetermined value $\alpha$, the knock limit point is shifted toward the advancement side.

Figure 11:
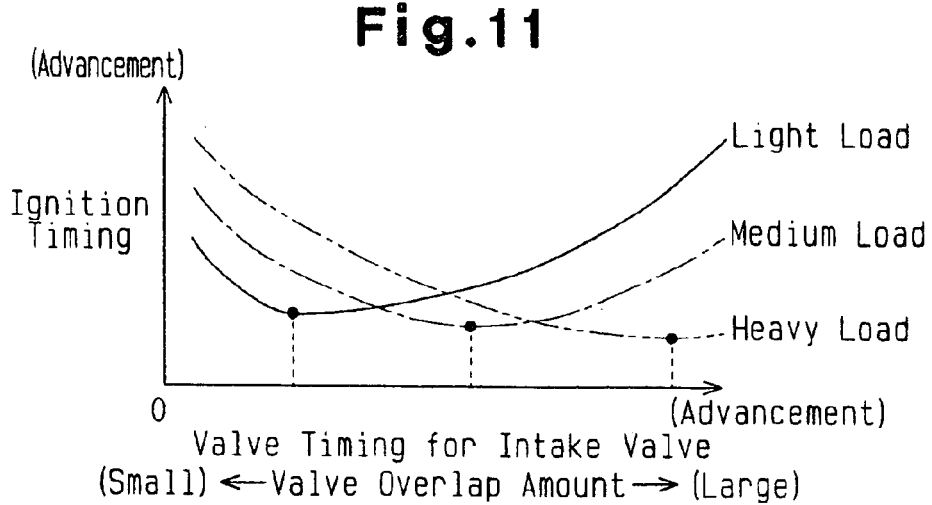
FIG. 11 is a graph illustrating variations in knock limit point with respect to the valve timing for the intake valve.

As the engine load and the amount of intake air increase, the effect of these variations on the knock limit point is more significant than that of variations in internal EGR amount because the substantial intake temperature and the actual compression ratio are inherently high. As a result, as shown in FIG. 11, the valve timing for the intake valve 12 indicating the bottom point P is shifted toward the advancement side as the engine load increases as shown in FIG. 11.

Figure 12:
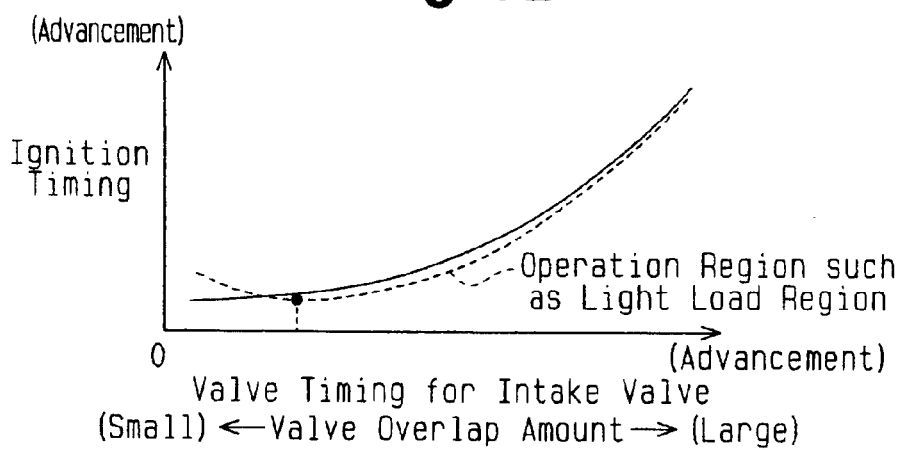
FIG. 12 is a graph illustrating variations in MBT limit point with respect to the valve timing for the intake valve.

FIG. 12 shows an example of the manner in which the MBT point varies relative to the valve timing for the intake valve 12. The degradation of the burning state following an increase in internal EGR amount markedly affects an engine output. However, variations in intake temperature or actual compression ratio do not markedly affect the engine output. Consequently, the MBT point tends to vary with the valve timing for the intake valve 12 as shown by the solid line in FIG. 12. However, the variation tendency shown by the broken line in FIG. 12 may be exhibited in some operation regions in which the internal EGR amount tends to vary as shown by the broken line in FIG. 10(a).

Figure 13:
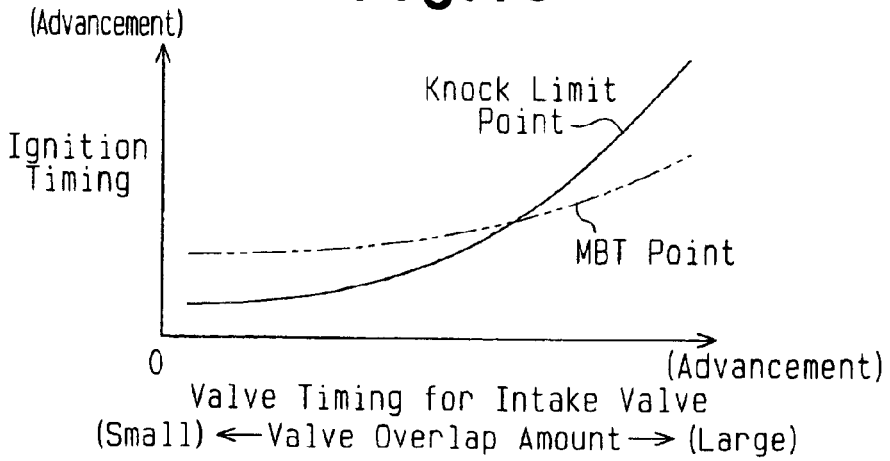
FIG. 13 is a graph illustrating variations in knock limit point and MBT point with respect to valve timing for an exhaust valve.

In some internal combustion engines, a valve actuation varying mechanism is provided on the exhaust side to variably control the valve timing for the exhaust valve. FIG. 13 shows an example of the manner in which the knock limit point and the MBT point vary with respect to the valve timing for the exhaust valve of such an internal combustion engine.

Even when the valve timing for the exhaust valve is changed, the valve overlap amount and thus the internal EGR amount change as in the case of a change in the valve timing for the intake valve. Specifically, if the valve timing for the exhaust valve is retarded, the valve overlap amount and thus the internal EGR amount increase. On the other hand, if the valve timing for the exhaust valve is significantly retarded, the exhaust may temporarily flow backward from an exhaust passage to an intake passage. As a result, the substantial intake temperature may rise slightly. However, the effect of such a rise in intake temperature on the occurrence of knocking is very insignificant compared to an increase in internal EGR amount. Moreover, the actual compression ratio does not substantially vary depending on a change in the valve timing for the exhaust valve. Consequently, both knock limit point and MBT point tend to vary monotonously toward the advancement side with respect to the retardation of the valve timing for the exhaust valve.

A summary of the above description will be given below.

The advancement of the valve timing for the intake valve increases the internal EGR amount (degrades the burning state) to shift the MBT point toward the retardation side.

The advancement of the valve timing for the intake valve increases the internal EGR amount to shift the knock limit point toward the retardation side. This also increases the substantial intake temperature and the actual compression ratio to shift the knock limit point toward the advancement side.

The retardation of the valve timing for the exhaust valve increases the internal EGR amount to shift the MBT point and knock limit point toward the advancement side.

The retardation of the valve timing for the exhaust valve also rises the substantial intake temperature. However, the effect of the rise on the knock limit point is more insignificant that that of an increase in internal EGR amount.

Description will now be given of the manner of calculating the knock limit point and the MBT point according to the present embodiment considering the variation tendency with respect to a change in valve actuation set value as described above.

(Calculation of MBT Point)

First, with reference to FIG. 14, description will be given of the manner of calculating the MBT point according to the present embodiment.

To calculate the MBT point, the base MBT point ambtvof is first determined in accordance with Equation (12), shown above, on the basis of the engine speed ne and the engine load (for example, the throttle opening degree ta). Furthermore, the base MBT point difference kambt at the present values of the engine speed ne and engine load is determined in accordance with Equation (16), shown above.

The base MBT point ambtvof indicates the ignition timing in which the maximum torque is obtained at the present values of the engine speed ne and engine load when the valve overlap amount is 0. The base MBT point difference kambt indicates the difference in ignition timing between (I) and (II).

(I) Ignition timing in which the maximum torque is obtained at the present values of the engine speed ne and engine load when an initial target value not subjected to corrections in accordance with the deposits is set as a value actuation set value.

(II) Ignition timing in which the maximum torque is obtained at the present values of the engine speed ne and engine load when the valve overlap amount is 0.

Then, in accordance with Equation (26) below, an overlap ratio tovrp is determined by dividing an actual overlap amount ovrpreal by an initial overlap amount ovrptbi. The initial overlap amount ovrptbi is indicative of a valve overlap amount observed when the valve actuation set value (the valve timing for the intake valve or exhaust valve or the like) is set at a control target value and has not subjected to corrections in accordance with deposits. In contrast, the actual overlap amount ovrpreal is indicative of a valve overlap amount observed at the present valve actuation set value, that is, after the valve actuation set value has been corrected in accordance with deposits.

$$tovrp = \frac{ovrpreal}{ovrptbi} \quad (26)$$

Subsequently, according to Equation (27) below, an MBT point correction coefficient kavvtmbt is determined in accordance with the actual overlap amount ovrpreal by squaring the overlap ration tovrp determined. The MBT point correction coefficient kavvtmbt is basically the same as the VVT advancement correction coefficient kavvt according to the first embodiment.

$$kavvtmbt = (tovrp)^2 \quad (27)$$

Moreover, in accordance with Equation (28) below, the advancement correction amount kvtmbt for the MBT point corresponding to the actual overlap amount ovrpreal is determined by multiplying the MBT point correction coefficient kavvtmbt by the base MBT point difference kambt. The thus calculated advancement correction amount kvtmbt at the MBT point is proportional to the square of the overlap ratio tovrp.

$$kvtmbt = kavvtmbt \times kambt \quad (28)$$

Then, in accordance with Equation (29) below, the MBT point ambt is determined by adding the determined advancement correction amount at the MBT point to the base MBT point ambtvof.

$$ambt = ambtvof + kvtmbt \quad (29)$$

Figure 14:
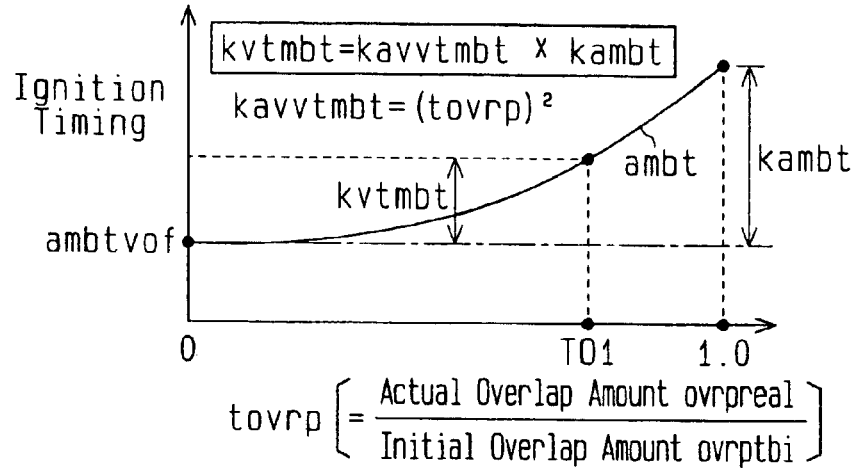
FIG. 14 is a graph illustrating a calculation of a MPT point variation amount according to a second embodiment of the present invention.

FIG. 14 shows the manner of calculating the MBT point ambt when the overlap ratio tovrp has a predetermined value TO1. The above manner of calculating the MBT point ambt is basically similar to that used in the first embodiment.

(Calculation of Knock Limit Point)

The knock limit points (first knock limit point aknok1 and second knock limit point aknok2) according to the preset embodiment will now be described with reference to FIG. 15. FIG. 15 illustrates the manner of calculating the first knock limit point aknok1. However, this is basically similar to the manner of calculating the second knock limit point aknok2.

To calculate both knock limit points, the first base knock limit point aknokvof and the second base knock limit point aknokbse are first determined in accordance with Equations (13) and (14), shown above. Also, according to Equation (17), the base knock limit point difference kaknk is computed.

Subsequently, in the present embodiment, a bottom point overlap amount ovrpbtm is determined in accordance with Equation (30) below on the basis of the present values of the engine speed ne and engine load. The bottom point overlap amount ovrpbtm is a valve overlap amount when the knock limit point exhibits the above described bottom point P when the valve actuation set value is changed at the present values of the engine speed ne and engine load. The values of the bottom point overlap amount ovrpbtm under respective engine operating conditions are already determined through experiments or the like and stored in the memory of the electronic control unit 16 as a map.

$$ovrpbtm = f_8(ne, ta) \tag{30}$$

Figure 15A:
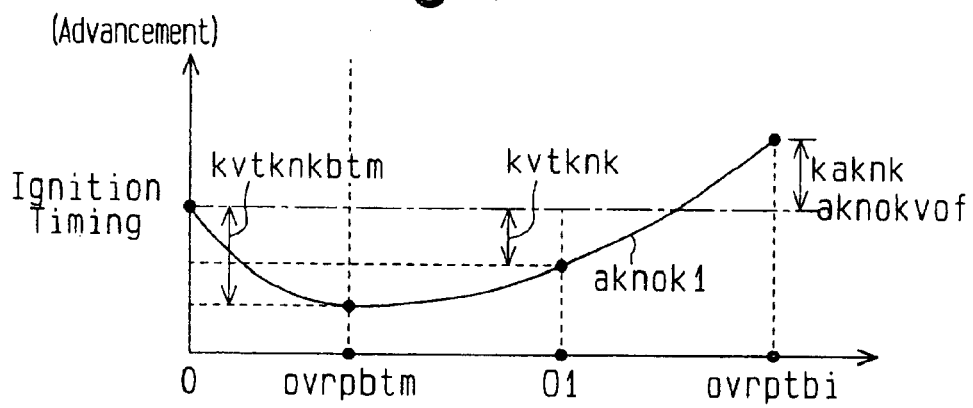
FIG. 15(a) is a graph illustrating a calculation of a knock limit point variation amount in a low to medium load region.
Figure 15B:
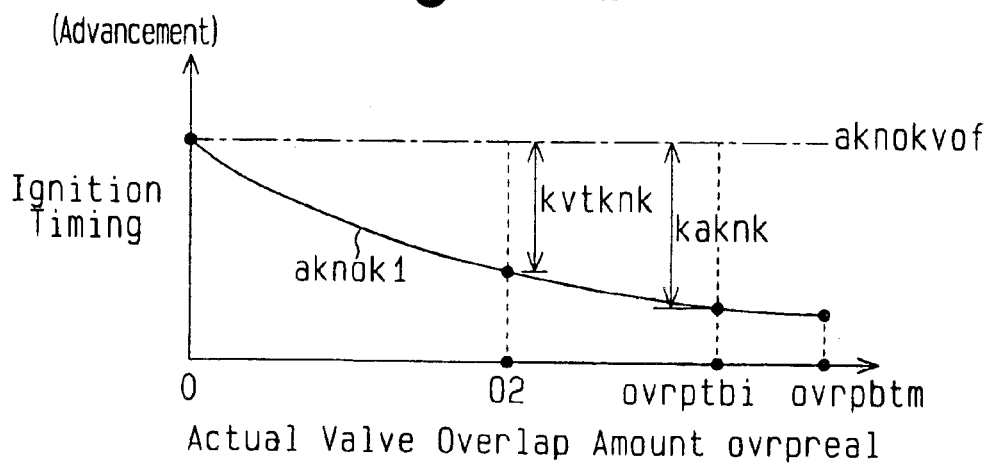
FIG. 15(b) is a graph illustrating a calculation of the knock limit point variation amount in a high load region.

As described above, an increase in engine load causes the bottom point P of the knock limit point to shift toward the advancement side of the valve timing for the intake valve, that is, so as to increase the valve overlap amount. In this internal combustion engine 10, in regions with a certain load or heavier, the bottom point overlap amount ovrpbtm is greater than the initial overlap amount ovrptbi as shown in FIG. 15(b). In this case, the manner of calculating the advancement correction amount kvtknk at the knock limit point is switched between light to middle load regions in which the bottom point overlap amount ovrpbtm is at most the initial overlap amount ovrptbi as shown in FIG. 15(a) and heavy load regions in which the bottom point overlap amount ovrpbtm exceeds the initial overlap amount ovrptbi as shown in FIG. 15(b).

First, for the light to middle load regions, after calculating the bottom point overlap amount ovrpbtm, the bottom point knock limit point difference kvtknkbtm is determined in accordance with Equation (31) below on the basis of the engine operating conditions (engine speed ne and engine load). The values of the bottom point knock limit point difference kvtknkbtm under respective engine operating conditions are already determined through experiments or the like and stored in the memory of the electronic control unit 16 as a map. The bottom point knock limit point difference kvtknkbtm indicates the difference in ignition timing between (III) and (IV) described below.
(III) Ignition timing in which the valve overlap amount is equal to the bottom point overlap amount ovrpbtm at the present values of the engine speed ne and engine load.
(IV) Ignition timing in which the valve overlap amount is 0 at the present values of the engine speed ne and engine load.

$$kvtknkbtm = f_9(ne, ta) \tag{31}$$

Then, the advancement correction amount kvtknk for the knock limit point corresponding to the actual overlap amount ovrpreal is determined in accordance with Equation (32) or (33) below. FIG. 15(a) shows an example of the manner of calculating the advancement correction amount kvtknk when the actual overlap amount ovrpreal has a predetermined value O1 in a light to middle load region.

$$[ovrpreal < ovrpbtm] \tag{32}$$
$$kvtknk = \left(\frac{ovrpbtm - ovrpreal}{ovrpbtm}\right)^2 \times (-kvtknkbtm) + kvtknkbtm$$

$$[ovrpreal \geq ovrpbtm] \tag{33}$$
$$kvtknk = \left(\frac{ovrpreal - ovrpbtm}{ovrptbi - ovrpbtm}\right)^2 \times (kaknk - kntknkbtm) + kvtknkbtm$$

On the other hand, for the heavy load regions in which the bottom point overlap amount ovrpbtm exceeds the initial overlap amount ovrptbi, the advancement correction amount kvtknk for the knock limit point corresponding to the actual overlap amount ovrpreal is determined in accordance with Equation (34) below. FIG. 15(b) shows an example of the manner of calculating the advancement correction amount kvtknk when the actual overlap amount ovrpreal has a predetermined value O2 in such a heavy load region.

$$kvtknk = \left(\frac{ovrptbi - ovrpreal}{ovrptbi}\right)^2 \times (-kaknk) + kaknk \tag{34}$$

Once the advancement correction amount kvtknk for the knock limit point is determined, the first knock limit point aknok1 and the second knock limit point aknok2 are determined in accordance with Equations (35) and (36) below by adding the determined advancement correction amount kvtknk to the first base knock limit point aknokvof and the second base knock limit point aknokbse, respectively.

$$aknok1 = aknokvof + kvtknk \tag{35}$$

$$aknok2 = aknokbse + kvtknk \tag{36}$$

Thus, in the present embodiment, the manner of calculating the advancement correction amount is switched between the MBT point and the knock limit point considering the difference, between the MBT point and the knock limit point, in the manner of variation dependent on the valve actuation set value as described above. That is, for the MBT point, the advancement correction amount kvtmbt is determined to be a value proportional to the square of the valve overlap amount. For the knock limit point, the advancement correction amount kvtknk is determined to be a value varying with respect to the valve overlap amount in a quadratic curve form with a bottom point. In the present embodiment, on the basis of these calculated values, the maximum advanced ignition timing absef, the maximum retarded ignition timing akmf, the required ignition timing afin, and others are calculated in the same manner as that in the first embodiment.

The above described present embodiment can produce the advantage described below, in addition to those described above in (1) to (4).

(5) In the present embodiment, the advancement correction amount for the knock limit point is set so as to vary, in a quadratic curve form with a bottom point, with respect to the set value of the valve actuation (valve timing or valve overlap amount) changed on the basis of the magnitude of a change in ignition timing made by the knock control to deal with deposits. Accordingly, the knock limit point or the MBT point can also be suitably corrected in association with a change in substantial intake temperature or actual compression ratio accompanying a change in valve actuation set value.

The equations for the calculations of the MBT point and knock limit point according to the present embodiment may be changed as necessary. The details of the manners of calculations may be arbitrarily altered as necessary as long as the calculations are executed so that the advancement correction amount kvtknk for the knock limit point is set so as to vary with respect to the set value of the valve actuation (valve timing or valve overlap amount) in a quadratic curve form with a bottom point.

As described above, in some operation regions such as light load regions, the MBT point also tends to vary with respect to the set value of the valve actuation in a quadratic curve form with a bottom point. For these operation regions, the advancement correction amount for the MBT point is set so as to vary with respect to the set value of the valve actuation in a quadratic curve form with a bottom point, as in the case of the advancement correction amount for the knock limit point according to the present embodiment. In this case, the MBT point can be set so as to match the variation tendency observed in these operation regions.

(Third Embodiment)

Figure 16:
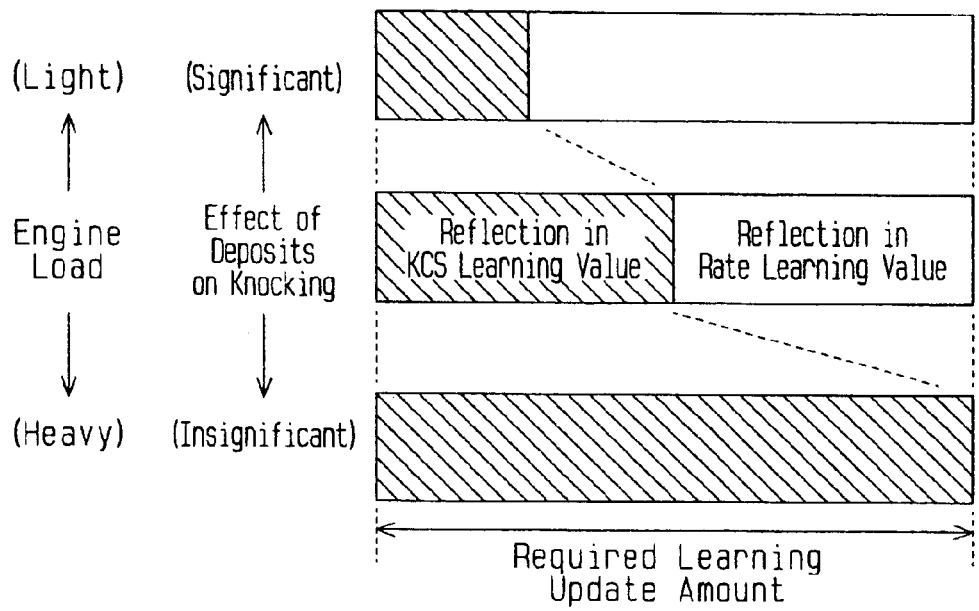
FIG. 16 is a chart conceptually showing the manner of distributing a learning value update amount according to a third embodiment of the present invention.

A control apparatus for an internal combustion engine according to a third embodiment of the present invention will now be described below with reference to FIGS. 16 to 18. The differences from the previous embodiments will be mainly discussed.

The first embodiment uses, as learning values for the knock control of the ignition timing, two learning values including the rate learning value rgknk, reflecting a change in ignition timing made to deal with deposits, and the KCS learning value agknk, which reflects a change in ignition timing made to deal with a factor other than of deposits. Description will be given below of the manner of updating these learning values according to the present embodiment.

In the present embodiment, if the KCS feedback correction value akcs deviates markedly from 0 (akcs<−1A or akcs>A), both learning values are updated. Then, a learning update amount tdl is determined on the basis of the magnitude of the deviation. The learning update amount tdl indicates the sum of the amount of update in a KCS feedback start point (required ignition timing afin at the time of akcs=0) resulting from the updating of the KCS learning agknk, and the amount of update in the KCS feedback start point resulting from the updating of the rate learning value rgknk. That is, the total amount of updates required for the KCS feedback start point.

Then, the learning update amount tdl is divided into a part reflected in the KCS learning value agknk and a part reflected in the rate learning value rgknk. In this case, the rate of each update amount distributed to the corresponding learning value is roughly determined in accordance with the engine load as illustrated in FIG. 16. For example, it is expected that there is a low probability that knocking is caused by a factor other than deposits in the light load regions. Accordingly, for the above distribution, the update amount (distribution rate) reflected in the rate learning value rgknk is increased. On the other hand, if the engine load increases, there is a higher probability that knocking is caused by a factor other than the deposits in the light load regions. Accordingly, with an increase in engine load, the update amount reflected in the rate learning value agknk is reduced, while increasing the update amount reflected in the KCS learning value agknk.

In the present embodiment, the distribution rate of the learning update amount tdl is indicated by a distribution ratio tk. The distribution ratio tk is indicative of the rate of the learning update amount tdl taken up by the update amount reflected in the KCS learning value agknk. Specifically, the distribution ratio tk has a value between 0 and 1. For the light load regions, the distribution ratio tk is set at a small value close to 0 (for example, 0.25). As the engine load increases, the value of the distribution ratio tk increases up to a value close to 1 (for example, 0.5). Then, on the basis of the set distribution ratio tk, the update amount Δagknk for the KCS learning value and the update amount Δrgknk for the rate learning value rgknk are calculated in accordance with Equations (37) and (38) below.

$$\Delta agknk = tk \times tdl \quad (37)$$

$$\Delta rgknk = (1-tk) \times (-tdl) \div DLAKNOK \quad (38)$$

When the engine load increases above a specified value, the effect of a factor other than the deposits on the occurrence of knocking is significantly greater than that of the deposits. Accordingly, the rate learning value is prohibited from being updated. Then, all of the learning update amount tdl is reflected in the KCS learning value agknk. Here, the engine operation region in which the rate learning value rgknk is prohibited from being updated is called a rate learning prohibited region.

If both learning values are updated using the above manner, the problems described in (A) and (B) may occur.

(A) Insufficient Update Caused by Maximum and Lower Limit Guard Values Set for Each Learning Value Normally, an upper limit value and a lower limit value are set for each learning value. The learning value is prohibited from being updated so as to increase above the upper limit value or decrease below the lower limit value even if that is required. For example, the rate learning value rgknk is restricted to the update range from 0 to 1. Accordingly, the rate learning value rgknk does not decrease below 0 or increase above 1. Specifically, a upper limit value RGKMX of 1 and a lower limit value RGKMN of 0 are set for the rate learning value rgknk. Furthermore, an upper limit value AGKMX (for example, 19°CA) and a lower limit value AGKMN are set for the KCS learning value agknk. Accordingly, the KCS learning value agknk is always at least the lower limit value AGKMN and at most the upper limit value AGKMX.

In this case, if either of the learning values is equal to the upper or lower limit value, the above distribution may preclude a required update. For example, if the learning value is equal to the upper limit value, it cannot be updated so as to further increase. If the learning value is equal to the lower limit value, it cannot be updated so as to further decrease. If such a situation continues to delay the updating of learning value, then the general learning speed may decrease. As a result, the KCS feedback start point may not be adequately corrected. Therefore, the KCS feedback may be insufficiently responsive.

(B) Unfit Learning Value

By varying the set value of the valve actuation depending on the status of deposit determined on the basis of the rate learning value rgknk as described above, it is possible to reduce the effect of deposits on the occurrence of knocking. That is, knocking is unlikely to be caused by deposits. Nevertheless, if the learning values are always uniformly updated, the rate learning value rgknk may be excessively updated with increasing correction amount for the valve actuation set value corresponding to deposits. Consequently, both learning values deviate from the actual situation. This may result in an occurrence of knocking due to an over advancement of the ignition timing, or degradation of output performance or fuel efficiency due to an over retardation of the ignition timing.

Thus, in the present embodiment, the process described below is executed to solve the problems (A) and (B).

First, as a solution to the problem (A), if one of the learning values cannot be updated as required owing to the upper or lower limit value, then all of the learning update amount tdl is reflected in the other learning value regardless of the setting of the distribution ratio tk. Thus, even if one of the learning values cannot be updated, the learning values as a whole are adequately updated. This favorably makes it possible to avoid a decrease in learning speed or the degradation of the responsiveness of the KCS feedback.

As a solution to the problem (B), in the present embodiment, the rate learning prohibited region is enlarged in accordance with an increase in the correction amount for the valve actuation set value corresponding to deposits. More specifically, in the present embodiment, the rate learning value rgknk is prohibited from being updated on condition that the second knock limit point aknok2 is equal to or less than a predetermined determination value DLKNOK.

Figure 17:
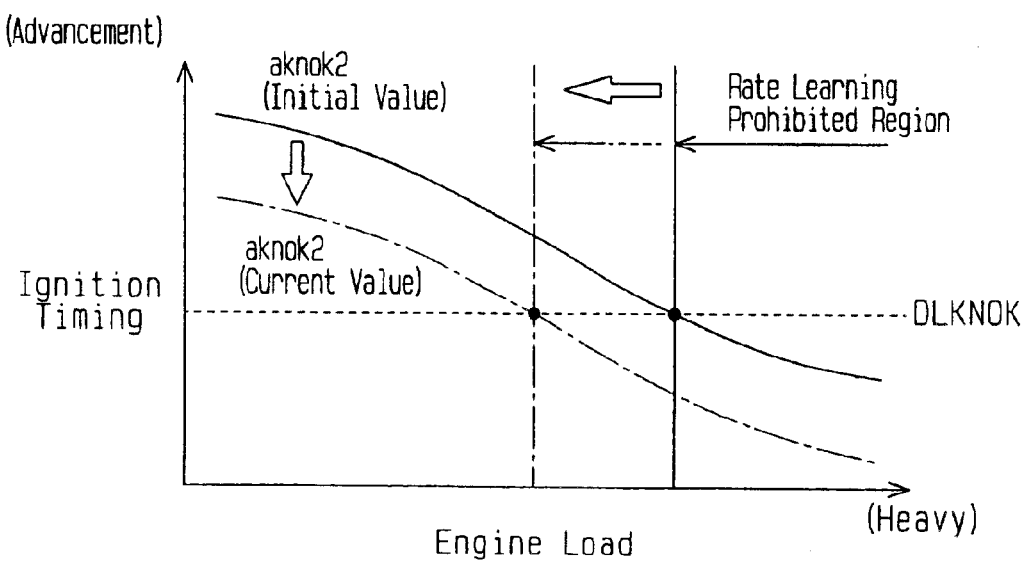
FIG. 17 is a graph illustrating setting of a rate learning prohibited region.

FIG. 17 shows the manner of setting the rate learning prohibited region. As shown in this figure, the second knock limit point aknok2 shifts toward the retardation side as the engine load increases. The solid line in this figure indicates a transition curve (initial values) of the second knock limit point aknok2 with respect to the engine load before a change in valve actuation set value corresponding to the deposition of deposits. The alternate long and short dash line in the figure indicates a transition curve (present values) after the change. When the valve actuation set value is thus changed in accordance with deposits, the second knock limit point aknok is shifted toward the retardation side. Consequently, the rate learning prohibited region, in which the second knock limit point aknok2 is equal to or less than the determination value DLKNOK, is enlarged in accordance with an increase in the magnitude of a change in valve actuation set value corresponding to deposits. This limits the updating of the rate learning value rgknk so as to increase the magnitude of a change in valve actuation set value corresponding to deposits, thus reducing the effect of deposits on the occurrence of knocking. Therefore, both learning values are hindered from deviating from the actual situation.

Figure 18:
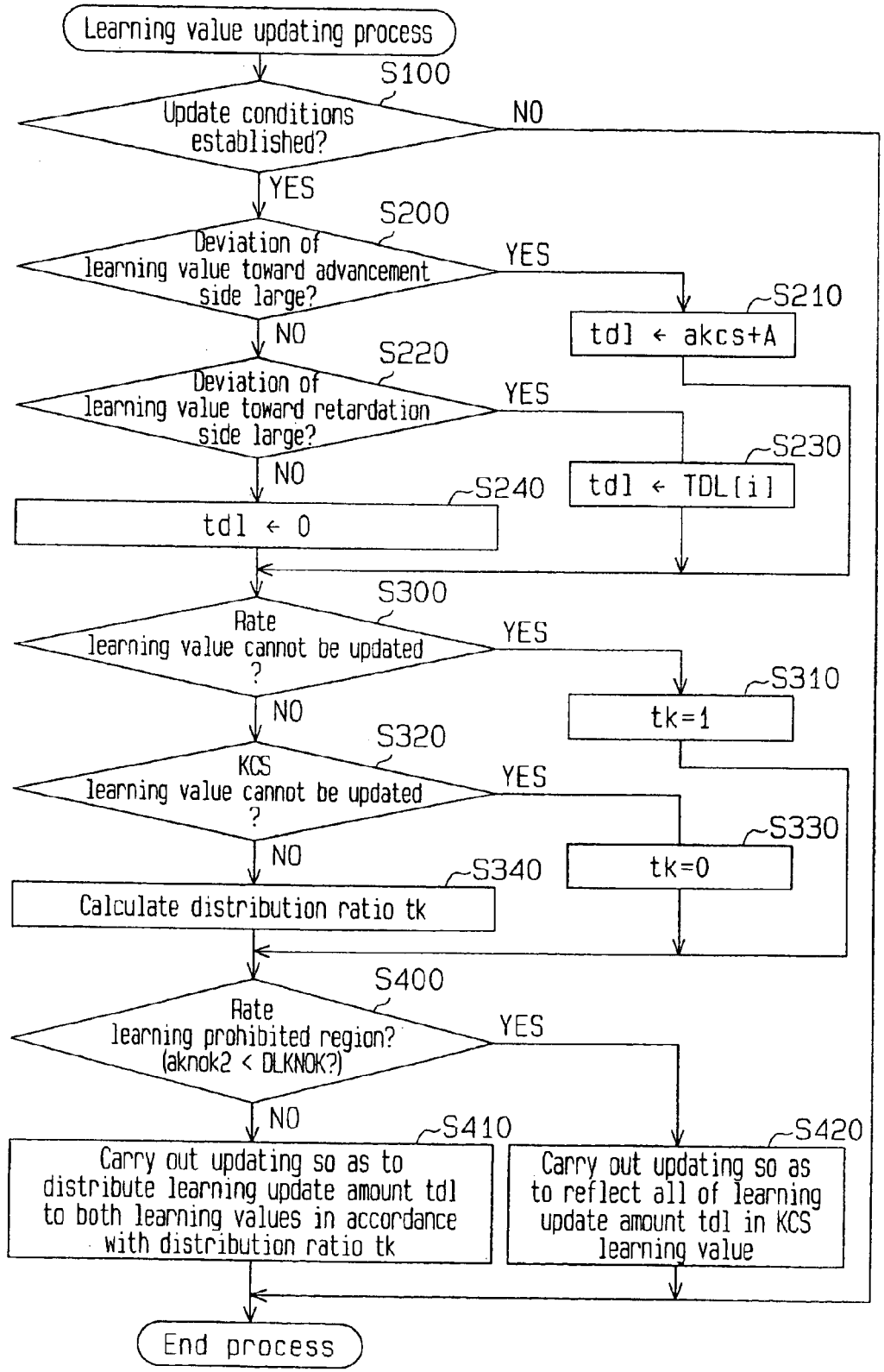
FIG. 18 is a flow chart of a learning value updating process.

FIG. 18 is a flow chart of the above described valve updating process according to the present embodiment. The electronic control unit 16 periodically executes the process shown in the figure while the engine is in operation. In the present embodiment, the KCS learning value agknk and the rate learning value rgknk are individually calculated for each of a plurality of regions into which the operation is divided according to the engine speed ne. In the description below, the learning regions are labeled with numbers 1, 2, ... n. The KCS learning value agknk and rate learning value rgknk for each learning are denoted by agknk[i] and rgknk[i] (i indicates the number of the learning region).

When the present process is started, the electronic control unit 16 first determines at a step S100 whether or not the conditions for the updating of the KCS learning value agknk and rate learning value rgknk have been established. The update conditions are assumed to be established when all the conditions described below are established.

The engine speed ne is within a predetermined range and is not in an extremely low or high rotation speed region.

A predetermined or longer time has elapsed since a transitional operation speed such as a rapid acceleration or deceleration ended, and the engine operation state is not unstable.

The internal combustion engine 10 has been warmed up.

The engine load is at a predetermined value or larger and is not in an extremely light load region.

If the update conditions are not established (NO), the electronic control unit 16 stops the process. On the other hand, if the update conditions are established (YES), the electronic control unit 16 advances the process to a step S200 to start a process of calculating the learning update amount tdl.

(Calculation of Learning Update Amount tdl)

After advancing the process to the step S200, the electronic control unit 16 calculates the learning update amount tdl in the manner described below. In this calculating process, on the basis of the KCS feedback correction value akcs, it is determined whether or not the deviation of the learning value toward the advancement or retardation side is large. Specifically, the electronic control unit 16 determines that the deviation of the learning value toward the advancement side is large if the KCS feedback correction value akcs is less than a predetermined negative value (−A) (S200: YES). The electronic control unit 16 determines that the deviation of the learning value toward the retardation side if the KCS feedback correction value akcs exceeds a predetermined positive value A (S220: YES).

(a) When Deviation of Learning Value Toward Advancement Side is Large

If the deviation of the learning value toward the advancement side is large, the electronic control unit 16 advances the process to a step S210. The electronic control unit 16 thus calculates the learning update amount tdl so as to correct the KCS feedback start point so that it is shifted toward the retardation side (a retarding process). Specifically, at the step S210, the electronic control unit 16 sets the learning update amount tdl by adding the above value A to the present KCS feedback correction value akcs.

(b) When Deviation of Learning Value Toward Retardation Side is Large

If the deviation of the learning value toward the retardation side is large, the electronic control unit 16 advances the process to a step S230. The electronic control unit 16 thus calculates the learning update amount tdl so as to correct the KCS feedback start point so that it is shifted toward the advancement side (an advancing process). Specifically, at the step S230, the electronic control unit 16 sets the learning update amount tdl at a predetermined value TDL [i] (in this case, i denotes the number of the learning region) set for each learning region.

(c) Other Cases

When the deviation of the learning value is small (S200: N0 and S220: NO), the electronic control unit 16 advances the process to a step S240. At the step S240, the electronic control unit 16 sets the learning update amount tdl at 0.

(Calculation of Distribution Ratio tk)

After the learning update amount tdl has thus been set, the electronic control unit 16 advances the process to a step S300 to start calculating the distribution ratio tk. In this process, the distribution ratio tk is calculated as described in (d) to (f).

(d) When Rate Learning Value rgknk Cannot be Updated Because It is at Maximum or Minimum When the rate learning value rgknk is equal to its upper limit value RGKMX or lower limit value RGKMN and thus cannot be updated as required (S300: YES), the electronic control unit 16 advances the process to a step S310. The presence of the above situation is specifically determined by checking whether or not a condition (d1) or (d2), described below, is established.

(d1) The rate learning value rgknk is equal to the lower limit value RGKMN (=1), and the learning update request indicates a shift toward the advancement side, that is, the learning update value tdl is greater than 0.

(d2) The rate learning value rgknk is equal to the upper limit value RGKMX (=0), and the learning update request indicates a shift toward the retardation side, that is, the learning update value tdl is less than 0.

In this case, at a step S310, the electronic control unit 16 sets the distribution ratio tk so that all of the learning update amount tdl is reflected in the KCS learning value agknk. That is, in this case, the distribution ratio tk is set at the value 1.

(e) When KCS Learning Value agknk Cannot be Updated Because It is at Maximum or Minimum When the KCS learning value agknk is equal to its upper limit value AGKMX or lower limit value AGKMN and thus cannot be updated as required (S320: YES), the electronic control unit 16 advances the process to a step S330. The presence of the above situation is specifically determined by checking whether or not a condition (e1) or (e2), described below, is established.

(e1) The KC-S learning value agknk is equal to the upper limit value AGKMX, and the learning update request indicates a shift toward the advancement side, that is, the learning update value tdl is greater than 0.

(e2) The KCS learning value agknk is equal to the lower limit value AGKMN, and the learning update request indicates a shift toward the retardation side, that is, the learning update value tdl is less than 0.

In this case, at a step S330, the electronic control unit 16 sets the distribution ratio tk so that all of the learning update amount tdl is reflected in the rate learning value rgknk. That is, in this case, the distribution ratio tk is set at the value 0.

(f) Case Other than (d) and (e)

In the case other than (d) and (e), that is, when both learning values can be updated (S300: N0 and S320: NO), the electronic control unit 16 advances the process to a step S340. Then, the electronic control unit 16 calculates the distribution ratio tk on the basis of the engine load. For example, in this case, the distribution ratio tk is set at 0.25 for light load regions and at 0.5 for regions with a specific load or more.

(Updating of Learning Value)

After setting the learning update amount tdl and the distribution ratio tk as described above, the electronic control unit 16 advances the process to a step S400 to start a process of updating the learning values.

At the step S400, the electronic control unit 16 determines whether or not the operation is in the rate learning prohibited region. This determination is made by checking whether or not the second knock limit point aknok2 is less than the predetermined determination value DLKNOK as described above (see FIG. 17).

If the operation is not in the rate learning prohibited region (S400: NO), the electronic control unit 16 advances the process to a step S410. At this step, the electronic control unit 16 carries out updating so as to distribute the learning update amount tdl to both learning values in accordance with the distribution ratio tk. At this time, the KCS learning value agknk is updated by adding the update amount Δagknk, determined using Equation (37), shown above, to the present value (agknk[i]←agknk [i]+Δagknk). Furthermore, at this time, the rate learning value rgknk is updated by adding the update amount Δrgknk, determined using Equation (38), shown above, to the present value (rgknk[i]←rgknk[i]+Δrgknk).

On the other hand, if the operation is in the rate learning prohibited region (S400: YES), the electronic control unit 16 advances the process to a step S420. At the step S420, the electronic control unit 16 carries out updating so as to reflect all of the learning update amount tdl in the KCS learning value agknk. Specifically, the updated KCS learning value agknk is calculated by adding the learning update amount tdl to the present value based on Equation (39), below. In this case, the rate learning value rgknk is maintained at the present value without being updated.

$$agknk[i]=agknk[i]+tdl \quad (39)$$

After thus updating the learning values, the electronic control unit 16 finishes the process. In the above described embodiments, the rate learning value rgknk corresponds to the first learning value, while the KCS learning value agknk corresponds to the second learning value.

The above described present embodiment can produce the advantage described below, in addition to those described in (1) to (4).

(6) In the present embodiment, both learning values are updated by determining the learning update amount tdl, which is the total amount of updates required for the feedback start point of the knock control, determining the distribution ratio tk, which is the rate of reflection of the learning update amount tdl in each learning value, and determining the amount of update in each learning value on the basis of the learning update amount tdl and distribution ratio tk. Thus, the feedback start point of the knock control is favorably updated in spite of the use of the two learning values.

(7) In the present embodiment, the distribution ratio tk is variably set in accordance with the engine operating conditions. More specifically, the distribution ratio tk is variably set so that with an increase in the engine load, the distribution ratio (1-tk) of the learning update amount tdl to the rate learning value rgknk decreases, while the distribution ratio (tk) of the learning update amount tdl to the KCS learning value agknk increases. This makes it possible to reduce the level of updating of the rate learning value rgknk as the engine load increases to relatively reduce the effect of deposits on the occurrence of knocking. This suppresses the excessive updating of the rate learning value rgknk. It is thus possible to further improve the learning accuracy of both leaning values.

(8) In the present embodiment, if one of the learning values cannot be updated because it is at the maximum or minimum of its update range, all of the learning update amount tdl is reflected in the other learning value regardless of the setting of the distribution ratio tk. Accordingly, even if one of the learning values cannot be updated, the other learning value can be used to compensate for the corresponding update. This makes it possible to favorably avoid a decrease in learning speed or the degradation of the responsiveness of the ignition timing feedback of the knock control.

(9) In the present embodiment, the rate learning prohibited region is variably set in accordance with the magnitude of a change in the set value of the valve actuation based on the magnitude of a change in ignition timing made to deal with deposits. More specifically, the rate learning prohibited region is enlarged to a light load side as the magnitude of the change increases. This makes it possible to reduce the level of updating of the rate learning value rgknk in accordance with a decrease in the effect of the deposits on the occurrence of knocking accompanying an increase in the magnitude of the change as described above. Therefore, the deviation of the learning values from the actual situation can be suppressed.

The above described present embodiment may be modified as described below.

In the above embodiments, the rate learning value rgknk and the KCS learning value agknk are determined for each of the learning regions into which the operation is divided according to the engine speed. However, the manner of division may be changed as necessary; for example, the learning regions may further be divided according to the engine load. Alternatively, such a division into the learning regions may not be carried out but the common rate learning value rgknk and KCS learning value agknk may be used for all the engine operation regions.

For the update conditions for the learning values, those illustrated above in the embodiment may be changed as necessary.

In the above embodiment, the distribution ratio tk is variably set in accordance with the engine load. However, the manner of setting the distribution ratio tk may be altered as necessary. For example, the distribution ratio tk may be determined on the basis of the engine speed ne in addition to the engine load. Alternatively, the distribution ratio tk may be determined using a different control parameter (the amount of intake are, the amount of injected fuel, or the like) reflecting the engine load.

For the manner of setting the learning update amount tdl, the one illustrated above in the embodiment may be altered as necessary.

In the above embodiment, the rate learning prohibited region is set on the basis of the second knock limit. However, the manner of setting may be altered as necessary. For example, the rate learning prohibited region may be set directly on the basis of the engine load. In this case, the advantage in (9) can be produced by enlarging the rate learning prohibited region to the light load side in accordance with the magnitude of a change in the set value of the valve actuation based on the magnitude of a change in ignition timing made to deal with deposits.

If the problem in (B) is negligible, it is allowable to omit the variable setting of the rate learning prohibited region in accordance with the magnitude of a change in the set value of the valve actuation. If the effect of the deposits on the occurrence of knocking is not negligible in all the engine operation regions, the setting of the rate learning prohibited region may be omitted. That is, it is allowable to omit the processing in the steps S400 and S420 of the learning value updating process.

If the problem in (A) is negligible, the processing in steps S300, S310, and S320 of the learning value updating process may be omitted.

(Fourth Embodiment)

A control apparatus for an internal combustion engine according to a fourth embodiment of the present invention will now be described below. The differences from the previous embodiments will be mainly discussed.

In the above embodiments, the deposit ignition timing retardation amount akgrg, that is, the retardation amount for the ignition timing associated with deposits, is determined by multiplying the maximum ignition timing retardation amount DLAKNOK by the rate learning value rgknk as shown above in Equation (7). As described above, the maximum ignition timing retardation amount DLAKNOK indicates the retardation amount for the required ignition timing afin required to deal with the assumed maximum amount of deposits under predetermined engine operating conditions under which the effect of the deposits is most marked. That is, the maximum ignition timing retardation amount DLAKNOK is a constant corresponding to a difference in required ignition timing between the case of no deposit and the case of the worst deposit under the predetermined engine operating conditions under which the effect of the deposits is most marked.

The level of the effect of the deposits on the ignition timing varies depending on the engine operating conditions. Accordingly, if the above difference in required ignition timing is to be precisely determined, its magnitude is desirably variably set in accordance with the engine operating conditions. The difference in required ignition timing based on, for example, the engine speed and engine load will hereinafter be referred to as a rate learning width dlaknok. The rate learning width dlaknok is defined, for example, as shown in Equation (40) below.

$$dlaknok = aknokbse + kaknk - aknoklmt \tag{40}$$

In Equation (40), aknoklmt denotes a maximum retarded knock limit point that is a knock limit point under assumed conditions with the worst deposit or burning environment in the present engine operation state. The maximum retarded knock limit point aknoklmt is calculated on the basis of the engine speed and the engine load using an arithmetic map that stores the maximum knock limit points aknoklmt for the respective engine operating conditions determined through experiments or the like.

With the rate learning width dlaknok, the deposit correction term adepvt in Equation (23), shown above, and the maximum retarded ignition timing akmf in Equation (24), shown above, are calculated as shown in Equations (41) and (42), respectively below.

$$adepvt = dlaknok \times rgknk \tag{41}$$

$$akmf = aknok2 - dlaknok \times rgknk - RTD \tag{42}$$

Furthermore, the update amount Argknk for the rate learning value rgknk in Equation (38), shown above, is calculated as shown in Equation (43) below.

$$\Delta rgknk = \frac{(1 - tk) \times (-tdl)}{delaknok} \tag{43}$$

As described above, the rate learning width dlaknok is determined in accordance with the engine operating conditions and used to, for example, calculate the maximum retarded ignition timing akmf and update the rate learning value rgknk. It is then possible to more accurately control the ignition timing while reflecting a variation in the level of the effect of the deposits on the ignition timing which variation depends on the engine operating conditions.

In the above embodiments, the internal EGR amount is reduced by lessening the valve overlap amount of the engine valves in accordance with the retardation of the ignition timing-carried out to deal with deposits. The internal EGR amount is thus reduced to improve the burning state to inhibit the degradation of the burning state caused by deposits. Accordingly, the effect of the deposits on the ignition timing decreases consistently with the valve overlap amount. However, if the rate learning width dlaknok, determined using Equation (40), shown above, is used as it is, then the decrease in the effect of the deposits may not be reflected in the ignition timing control. Consequently, the required ignition timing afin, the KCS learning value agknk, the rate learning value rgknk, or the like can deviate from its optimum value.

Therefore, in order to further improve the accuracy of the ignition timing control, the rate learning width dlaknok must be reduced consistently with the valve overlap amount. For example, in place of the rate learning width dlaknok in Equation (40), a rate learning value dlaknok' determined using Equation (44) below may be used.

$$dlaknok' = (aknokbse + kaknk - aknoklmt) \times kavvt \tag{44}$$

The above setting of the rate learning prohibited region exemplified in FIG. 17 may also be executed using the rate learning width dlaknok'. Specifically, appropriate learning can also be achieved while suppressing the deviation of the learning values from the actual situation, by setting the rate learning prohibited region so that the rate learning value rgknk is prohibited from being updated when the value of the rate learning width dlaknok' is at most a predetermined determination value DLKNOK'.

Figure 19:
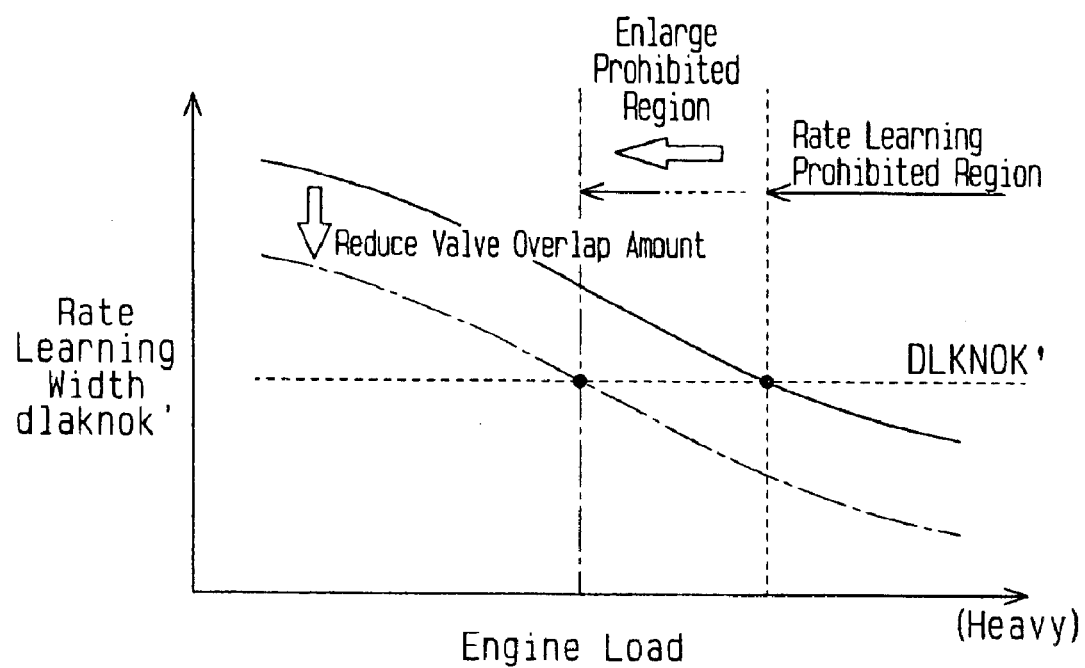
FIG. 19 is a graph illustrating setting of the rate learning prohibited region according to a fourth embodiment of the present invention.

FIG. 19 shows such a manner of setting the rate learning prohibited region. The solid line in this figure indicates the relationship between the engine load and the rate learning width dlaknok' before a reduction in valve overlap amount corresponding to deposits. The alternate long and short dash line in the figure indicates the same relationship after the reduction.

As shown in this figure, the rate learning width dlaknok' tends to decrease with increasing engine load. This is because an increase in engine load reduces the effect of the deposits on the ignition timing. On the other hand, when the overlap amount is reduced in accordance with deposits, the rate learning width dlaknok' is also reduced. As a result, the rate learning prohibited region is enlarged in accordance with a reduction in valve overlap amount corresponding to deposits. In other words, the region in which the rate learning is permitted is narrowed. Therefore, also in this case, a reduction in valve overlap amount allows the updating of the rate learning value rgknk to be increasingly limited as the effect of the deposits on the occurrence of knocking decreases. This suppresses the deviation of the learning values from the actual situation.

What is claimed is:

1. A control apparatus for an internal combustion engine, the engine generating power by combusting mixture of air and fuel, wherein the apparatus performs a knock control for adjusting an ignition timing, at which the air-fuel mixture is ignited, and a variable valve actuation control for adjusting a valve actuation, which is actuation of a valve of the engine, in accordance with the occurrence of knocking in the engine,
wherein the apparatus determines the magnitude of a change in the ignition timing due to adhesion of deposits in the engine based on the results of the knock control, and wherein, based on the magnitude of the change in the ignition timing, the apparatus changes a set value of the valve actuation in the variable valve actuation control.

2. The apparatus according to claim 1, wherein the apparatus determines the magnitude of the change in the ignition timing based on the difference in required ignition timing between a case where no deposits are present and the current state of deposits.

3. The apparatus according to claim 2, wherein the apparatus determines the magnitude of the change in the ignition timing based on the difference in the required ignition timing under a predetermined engine operating condition where deposits produces a marked adverse effect.

4. The apparatus according to claim 1, wherein, to change the set value of the valve actuation, the apparatus reduces an allowable variable range of the valve actuation as the magnitude of the change in the ignition timing is increased.

5. The apparatus according to claim 1, wherein the apparatus corrects required ignition timing according to the set value of the valve actuation that has been changed based on the magnitude of the change in the ignition timing.

6. The apparatus according to claim 5, wherein the variable valve actuation control includes adjusting the valve timing of the valve, and wherein the apparatus sets a correction amount used for correcting the ignition timing such that the correction amount is proportional to the square of the ratio of the set value of the valve timing that has been changed based on the magnitude of the change in the ignition timing to a set value of the valve timing in a state where no deposits collect.

7. The apparatus according to claim 5, wherein the valve is one of an intake valve and an exhaust valve, wherein the variable valve actuation control includes adjusting the valve overlap amount of the valves, and wherein the apparatus sets a correction amount used for correcting the ignition timing such that the correction amount is proportional to the square of the ratio of the set value of the valve overlap amount that has been changed based on the magnitude of the change in the ignition timing to a set value of the valve overlap amount in a state where no deposits collect.

8. The apparatus according to claim 5, wherein the variable valve actuation control includes adjusting the valve timing of the valve, and wherein the apparatus sets a correction amount used for correcting the ignition timing such that the correction amount varies in a quadratic curve form with a bottom point with respect to the set value of the valve timing that has been changed based on the magnitude of the change in the ignition timing.

9. The apparatus according to claim 5, wherein the valve is one of an intake valve and an exhaust valve, wherein the variable valve actuation control includes adjusting the valve overlap amount of the valves, and wherein the apparatus sets a correction amount used for correcting the ignition timing such that the correction amount varies in a quadratic curve form with a bottom point with respect to the set value of the valve overlap amount that has been changed based on the magnitude of the change in the ignition timing.

10. The apparatus according to claim 9, wherein the valve overlap amount when the correction amount of the ignition timing exhibits the bottom point is set to have a greater value as the engine load increases.

11. The apparatus according to claim 1, wherein the apparatus corrects maximum torque ignition timing, at which the engine generates the maximum torque, according to the set value of the valve actuation that has been changed based on the magnitude of the change in the ignition timing.

12. The apparatus according to claim 1, wherein the apparatus corrects knock limit point ignition timing according to the set value of the valve actuation that has been changed based on the magnitude of the change in the ignition timing.

13. The apparatus according to claim 1, wherein the apparatus corrects at least one of maximum advanced ignition timing and maximum retarded ignition timing in the knock control according to the set value of the valve actuation that has been changed based on the magnitude of the change in the ignition timing.

14. The apparatus according to claim 1, wherein, when the degree of deposits is expressed as a rate, the rate having a value of 0 in a state where no deposits collect and a value of 1 in a state where the amount of deposits reaches an assumed maximum value, the apparatus computes a rate learning width, which is an amount of retardation of the ignition timing that corresponds to engine operating conditions when the amount of deposits reaches the assumed maximum value, and wherein the apparatus multiplies the rate learning width by the rate expressing the degree of deposits, and sets the result of the multiplication as a retardation amount of the ignition timing that corresponds to the present level of deposits, and wherein the apparatus corrects the rate learning width according to the set value of the valve actuation that has been changed based on the magnitude of the change in the ignition timing.

15. The apparatus according to claim 1, wherein, in the knock control, the apparatus separately learns a first learning value, which reflects the magnitude of the change in the ignition timing made to deal with deposits, and a second learning value, which reflects the magnitude of the change in the ignition timing made to deal with a factor other than deposits.

16. The apparatus according to claim 15, wherein, when updating the first leaning value and the second learning value, the apparatus computes a learning update amount, which is the total amount of update amount required for the feedback start point of the knock control, and determines a distribution ratio of the learning update amount, which ratio represents the rate of the learning update amount reflected in the first learning value and the rate of the learning update amount reflected in the second learning value, and wherein the apparatus determines an update amount of the first learning value and an update amount of the second learning value according to the learning update amount and the distribution ratio.

17. The apparatus according to claim 16, wherein the distribution ratio is changed in accordance with the engine operating conditions.

18. The apparatus according to claim 16, wherein the distribution ratio is changed in accordance with the engine load.

19. The apparatus according to claim 16, wherein the update of the first learning value and the update of the second learning value are each restricted to a predetermined update range, wherein, if one of the learning values cannot be updated as required owing to the restriction of the update range, the apparatus reflects all of the learning update amount in the other learning value regardless of the setting of the distribution ratio.

20. The apparatus according to claim 15, wherein the apparatus sets an engine operation region in which the first learning value is prohibited from being updated, and changes the engine operation region according to the amount of the change in the set value of the valve actuation based on the magnitude of the change in the ignition timing.

21. The apparatus according to claim 20, wherein the engine operation region is a region in which the load acting on the engine is higher than a predetermined load, and wherein the apparatus changes the predetermined load to a lower load as the amount of the change in the set value of the valve actuation based on the magnitude of the change in the ignition timing is increased.

22. The apparatus according to claim 15, wherein, when the degree of deposits is expressed as a rate, the rate having a value of 0 in a state where no deposits collect and a value of 1 in a state where the amount of deposits reaches an assumed maximum value, the apparatus computes a rate learning width, which is an amount of retardation of the ignition timing that corresponds to engine operating conditions when the amount of deposits reaches the assumed maximum value, and wherein the apparatus multiplies the rate learning width by the rate expressing the degree of deposits, and sets the result of the multiplication as a retardation amount of the ignition timing that corresponds to the present level of deposits, wherein the apparatus corrects the rate learning width according to the set value of the valve actuation that has been changed based on the magnitude of the change in the ignition timing, and wherein, when the corrected rate learning width is no more than a predetermined determination value, the apparatus prohibits the first learning value from being updated.

23. A method for controlling an internal combustion engine, the engine generating power by combusting mixture of air and fuel, the method comprising:

performing a knock control for adjusting an ignition timing, at which the air-fuel mixture is ignited, in accordance with the occurrence of knocking in the engine;

performing a variable valve actuation control for adjusting a valve actuation, which is actuation of a valve of the engine in accordance with the occurrence of knocking in the engine;

determining the magnitude of a change in the ignition timing due to adhesion of deposits in the engine based on the results of the knock control; and changing a set value of the valve actuation in the variable valve actuation control based on the magnitude of the change in the ignition timing.

* * * * *